(12) United States Patent
Ogura et al.

(10) Patent No.: US 6,429,724 B1
(45) Date of Patent: Aug. 6, 2002

(54) SEMICONDUCTOR DEVICE CAPABLE OF GENERATING A PLURALITY OF VOLTAGES

(75) Inventors: Taku Ogura; Masaaki Mihara, both of Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/699,370

(22) Filed: Oct. 31, 2000

Related U.S. Application Data

(63) Continuation of application No. 09/172,769, filed on Oct. 15, 1998, now Pat. No. 6,147,547.

(30) Foreign Application Priority Data

May 25, 1998 (JP) ........................................... 10-143213

(51) Int. Cl.$^7$ ............................................... G05F 1/10
(52) U.S. Cl. .................... 327/536; 327/390; 327/537
(58) Field of Search ................................ 327/534, 535, 327/536, 537, 589, 390; 326/88; 307/110; 363/59, 60

(56) References Cited

U.S. PATENT DOCUMENTS

| | | | |
|---|---|---|---|
| 4,807,104 A | | 2/1989 | Floyd et al. |
| 5,262,934 A | | 11/1993 | Price .......................... 363/60 |
| 5,306,954 A | | 4/1994 | Chan et al. .................. 307/110 |
| 5,396,114 A | * | 3/1995 | Lee et al. ..................... 327/535 |
| 5,546,044 A | * | 8/1996 | Calligaro et al. ............ 327/543 |
| 5,606,491 A | | 2/1997 | Ellis ............................. 363/60 |
| 5,668,710 A | * | 9/1997 | Caliboso et al. ............... 363/60 |
| 5,748,032 A | | 5/1998 | Baek ........................... 327/536 |
| 5,812,018 A | | 9/1998 | Sudo et al. .................. 327/537 |
| 5,917,366 A | * | 6/1999 | Nakano ....................... 327/536 |
| 6,023,188 A | * | 2/2000 | Lee et al. .................... 327/536 |
| 6,147,547 A | * | 11/2000 | Ogura et al. ................. 327/536 |
| 6,184,741 B1 | | 2/2001 | Ghiardelli et al. |

FOREIGN PATENT DOCUMENTS

JP 7-177729 7/1995

* cited by examiner

*Primary Examiner*—Timothy P. Callahan
*Assistant Examiner*—Hai L. Nguyen
(74) *Attorney, Agent, or Firm*—McDermott, Will & Emery

(57) ABSTRACT

Output nodes (Noutn, Noutp) outputting a negative potential (VN) and a positive potential (VPS) respectively are supplied with fixed potentials by reset circuits respectively when unused. Switches (SW2, SW3) conduct when generating the negative potential, while switches (SW1, SW4) conduct when generating the positive potential. Reference potentials for the generated potentials are supplied to internal nodes N10, N20) through the switches (SW1, SW3) respectively. Poly-diode elements are employed for a voltage generation part, whereby a charge pump circuit capable of generating positive and negative voltages can be implemented without remarkably changing a fabrication method.

5 Claims, 36 Drawing Sheets

FIG. 4

|  | SW1 | SW2 | SW4 | SW3 | VPSRSTE | VNRSTE |
|---|---|---|---|---|---|---|
| USING VPS | ON | OFF | ON | OFF | L INACTIVE | H ACTIVE |
| USING VN | OFF | ON | OFF | ON | H ACTIVE | L INACTIVE |

FIG. 6

|  | VNE | INVSTILH | VPSRSTE | VNRSTE |
|---|---|---|---|---|
| USING VPS | L | L | L INACTIVE | H ACTIVE |
| USING VN | H | L→H | H ACTIVE | L INACTIVE |

FIG. 39

|  | VNE | VPSRSTE | VNRSTE |
|---|---|---|---|
| USING VPS | L | L INACTIVE | H ACTIVE |
| USING VN | H | H ACTIVE | L INACTIVE |

FIG. 43

|  | VNE | VPSRSTE | VNRSTE |
|---|---|---|---|
| USING VPS | L | L INACTIVE | H ACTIVE |
| USING VN | H | H ACTIVE | L INACTIVE |

| GENERATED POTENTIAL | VPL | VPM | VPS | VN |
|---|---|---|---|---|
| ERASE | 12V | UNUSED | UNUSED | -11V |
| WRITE | 12V | 5~9V | UNUSED | -11V |
| OP RECOVER | 12V | 8V | 6V | UNUSED |

SEMICONDUCTOR DEVICE CAPABLE OF GENERATING A PLURALITY OF VOLTAGES

This application is a continuation of application Ser. No. 09/172,769, filed Oct. 15, 1998 Now U.S. Pat. No. 6,147,547.

BACKGROUND OF THE INVENTION

1. Field of the Invention

The present invention relates to a semiconductor device, and more particularly, it relates to a charge pump circuit generating a boosted potential or a negative potential from a power supply potential supplied from the exterior and a nonvolatile semiconductor memory device comprising the same.

2. Description of the Prior Art

A semiconductor device such as a flash memory electrically writing, reading or erasing data generates a plurality of potentials in its interior in addition to a power supply potential which is supplied from the exterior, for writing, reading or erasing data through these potentials.

In the flash memory, for example, each memory cell is formed by a single transistor having a drain and a control gate which are connected to a bit line and a word line respectively. The flash memory erases data by applying a positive high potential to the control gate of the transistor forming the memory cell while applying a negative high potential to the source and a P well thereby injecting electrons into a floating gate through the F-N (Fowler-Nordheim) tunnel effect.

On the other hand, the flash memory writes data by applying a negative high potential to the control gate while applying a positive high potential to the drain thereby extracting electrons from the floating gate through the tunnel effect.

Internal potentials employed in respective operations of a conventional flash memory are now described.

FIGS. 44A and 44B are adapted to illustrate potentials supplied to each memory cell of the conventional flash memory in respective modes.

In an erase operation for a selected block, a source potential Vs, a control gate potential Vcg and a potential BG of a well part (hereinafter referred to as a back gate) forming a channel of a transistor are −11 V, 12 V and −11 V respectively, and a drain potential Vd is in a floating state (Z) as shown in FIGS. 44A and 44B.

In a write operation for the selected block, the source potential Vs is in a floating state (Z), and the control gate potential Vcg, the back gate potential BG and the drain potential Vd are −11 V, 0 V and 5 to 9 V (set in units of 0.3 V) respectively.

In an OP (over-program) recovery operation for returning a threshold value into a normal range for recovering the selected block from an overwritten state, the source potential Vs, the control gate potential Vcg, the back gate potential BG and the drain potential Vd are 0 V, 6 V, 0 V and 8 V respectively.

In a read operation for the selected block, the source potential Vs, the control gate potential Vcg, the back gate potential BG and the drain potential Vd are 0 V, 3 V, 0 V and less than 1 V respectively.

When a power supply potential which is supplied from the exterior is only 3 V, therefore, the flash memory generally comprises a plurality of positive and negative potential generation circuits containing charge pump circuits therein, in order to generate the potentials of 12 V, 5 to 9 V, 8 V, 6 V and −11 V through the power supply potential respectively.

FIG. 45 is adapted to illustrate potentials generated by the charge pump circuits in the respective modes of the conventional flash memory.

Referring to FIG. 45, the conventional flash memory comprises three positive potential generation charge pump circuits generating positive potentials VPL, VPM and VPS respectively and a negative potential generation charge pump circuit generating a negative potential VN.

In case of erasing data in any memory cell, the positive and negative potentials VPL and VN are 12 V and −11 V respectively, while the positive potentials VPM and VPS are not used. The positive potential VPL is supplied to a selected word line. The negative potential VN is supplied to a well formed with a memory cell transistor and the source of the memory cell transistor.

In case of writing data in any memory cell, the positive potentials VPL and VPM are 12 V and 5 to 9 V respectively, and the negative potential VN is −11 V, while the positive potential VPS is not used. The positive potentials VPL and VPM and the negative potential VN are supplied to a selected selector gate line, a selected main bit line and a word line of a memory transistor respectively.

In OP recovery, the positive potentials VPL, VPM and VPS are 12 V, 8 V and 6 V respectively, while the negative potential VN is not used. The positive potentials VPL, VPM and VPS are supplied to a selected selector gate line, a selected main bit line and a word line of a memory transistor respectively.

As understood from the above description, the positive potential VPS and the negative potential VN are not simultaneously required in any operation. If a single circuit is servable both as the positive and negative potential generation charge pump circuits for generating the positive potential VPS and the negative potential VN, therefore, the area for a single charge pump circuit can be reduced.

FIG. 46 is a circuit diagram showing the structure of a conventional charge pump circuit for generating positive and negative potentials disclosed in Japanese Patent Laying-Open No. 7-177729 (1995).

Referring to FIG. 46, the conventional charge pump circuit for generating positive and negative potentials includes a P-channel MOS transistor 816, receiving a control signal P-IN in its gate, which is connected between a power supply potential Vcc and a node L, a diode 801 having an anode and a cathode which are connected to the node L and a node A respectively, a diode 802 having an anode and a cathode which are connected to the node A and a node B respectively, a diode 803 having an anode and a cathode which are connected to the node B and a node C respectively, a diode 804 having an anode and a cathode which are connected to the node C and a node D respectively, a diode 805 having an anode and a cathode which are connected to the node D and a node E respectively, a diode 806 having an anode and a cathode which are connected to the node E and a node F respectively, a diode 807 having an anode and a cathode which are connected to the node F and a node M respectively, and an N-channel MOS transistor 817, receiving a control signal N-IN in its gate, which is connected between a ground potential GND and the node M.

The conventional charge pump circuit for generating positive and negative potentials further includes a capacitor 840 connected between a clock node which is supplied with a clock signal PH and the node A, a capacitor 841 connected between a complementary clock node which is supplied with a clock signal /PH, complementary to the clock signal PH, and the node B, a capacitor 842 connected between the clock node and the node C, a capacitor 843 connected between the complementary clock node and the node D, a capacitor 844 connected between the clock node and the node E, and a capacitor 845 connected between the complementary clock node and the node F.

Operations of the conventional charge pump circuit for generating positive and negative potentials are now briefly described.

In case of generating a positive potential VHP, the control signal P-IN is activated and the P-channel MOS transistor 816 conducts to supply the power supply potential Vcc to the node L. On the other hand, the control signal N-IN is inactivated and the N-channel MOS transistor 817 enters a non-conducting state. A voltage responsive to the amplitude of the clock signals PH and /PH and the stage number of the diodes 801 to 807 is generated by a charge pump operation to cause a constant potential difference between the nodes L and M. Since the node L is supplied with the power supply potential Vcc, the potential of the node M reaches a constant level which is higher than the power supply potential Vcc, to provide the positive potential VHP.

In case of generating a negative potential VHN, on the other hand, the control signal N-IN is activated and the N-channel MOS transistor 817 conducts to supply the ground potential GND to the node M. On the other hand, the control signal P-IN is inactivated and the P-channel MOS transistor 816 enters a non-conducting state. A voltage responsive to the amplitude of the clock signals PH and /PH and the stage number of the diodes 801 to 807 is generated to cause a constant potential difference between the nodes L and M. Since the node M is supplied with the ground potential GND, the potential of the node L reaches a constant level which is lower than the ground potential GND, to provide the negative potential VHN.

FIG. 47 is a sectional view for illustrating the structures of diode elements employed as some of the diodes 801 to 807 in FIG. 46.

In case of employing MOS transistors as diodes in general, diodeconnected N-channel MOS transistors are employed as diode elements for forming a charge pump circuit for generating a positive voltage, while diode-connected P-channel MOS transistors are employed as diode elements for forming a charge pump circuit for generating a negative potential.

When MOS transistors are employed as diode elements, therefore, no common voltage generation part is applicable to charge pumping for generating both positive and negative potentials.

In order to implement the circuit shown in FIG. 46, therefore, PN junction diodes formed on an SOI substrate are employed.

Referring to FIG. 47, an SOI substrate 852 comprises an insulator film 856 which is formed on a silicon substrate 854. Diodes 801 to 803 which are PN junction diodes are formed on the insulator film 856.

The diode 801 includes a P-type impurity region 801a and an N-type impurity region 801b. The diode 802 includes a P-type impurity region 802a and an N-type impurity region 802b. The diode 803 includes a P-type impurity region 803a and an N-type impurity region 803b.

The P-type and N-type impurity regions 801a and 801b are connected to a power supply potential Vcc and a node A respectively. The P-type and N-type impurity regions 802a and 802b are connected to the node A and a node B respectively. The P-type and N-type impurity regions 803a and 803b are connected to the node B and a node C respectively.

A capacitor 840 is connected between the node A and a node receiving a clock signal PH, and a capacitor 842 is connected between the node B and a node receiving a clock signal /PH.

When such a structure is employed, the diodes can be electrically isolated from each other, to be capable of sharing a charge pump part for generating positive and negative voltages.

Also in the flash memory, memory cells, peripheral circuits and the like are reduced in size following refinement year by year, similarly to a dynamic random access memory. Among the peripheral circuits, however, particularly a charge pump circuit must ensure a capacitor size which is necessary for current consumption and a stage number which is necessary for generating a high voltage, and hence it is difficult to reduce the charge pump circuit in size.

The reasons for this are as follows: Since the F-N tunnel effect is utilized for writing/erasing data in any memory cell, it is necessary to reduce the thickness of a tunnel oxide film of the memory cell in order to suppress a voltage necessary for writing/erasing. In consideration of reliability, however, such reduction of the thickness of the tunnel oxide film is limited. Further, a constant area is necessary for ensuring the capacitance of the capacitor.

Following refinement, therefore, the ratio of the occupied area of the charge pump circuit in the chip is disadvantageously increased.

In the conventional technique of employing a common charge pump circuit for generating positive and negative voltages for reducing the area thereof, further, the fabrication cost is disadvantageously increased as compared with the case of employing a general silicon substrate, due to the employment of an SOI substrate.

When PN junction diodes (hereinafter referred to as poly-diode elements) of polysilicon are employed as diodes in order to solve this problem, no problem of a latch-up phenomenon or the like arises dissimilarly to the case of employing MOS diodes. In this case, however, aluminum interconnections are directly brought into electrical contact with the poly-diode elements. Therefore, reaction takes place in the interfaces between the aluminum interconnections and the poly-diode elements to disperse contact resistance, disadvantageously leading to dispersion of the characteristics of the poly-diode elements. Further, the conventional poly-diode elements are weak against electrical noise such as surge or contamination.

SUMMARY OF THE INVENTION

An object of the present invention is to provide a charge pump circuit, whose occupied area in a chip can be reduced, capable of generating positive and negative potentials without remarkably changing a fabrication process therefor from that employed for a conventional flash memory or the like, by employing a poly-diode element which is improved in performance.

Another object of the present invention is to provide a nonvolatile semiconductor memory device enabling reduction of an occupied area in a chip and ready formation of a capacitor, necessary for charge pumping, with a floating gate material and a control gate material serving as both electrodes due to the possibility of implementing a charge pump circuit capable of generating positive and negative potentials without remarkably changing a fabrication process therefor from that employed for a conventional flash memory or the like by employing a poly-diode element which is improved in performance.

Briefly stated, the present invention is directed to a charge pump circuit provided on a semiconductor substrate, which comprises a first power supply node, a second power supply node, a pumping portion, a first output node, a second output node, and a operation mode switching circuit.

The first power supply node receives a first power supply potential. The second power supply node receives a second power supply potential being lower than the first power supply potential. The pumping portion has a first and a second internal nodes, and is driven by a clock signal and renders the potential of the second internal node higher than that of a first internal node. The pumping portion includes a first poly-diode element so provided as to have a forward direction from the first internal node toward the second internal node, a second poly-diode element having the forward direction and serially connected to the first poly-diode element, and a capacitor having a first electrode being connected to a connection node between the first and second poly-diode elements and a second electrode being supplied with the clock signal. The first output node is supplied with a first output potential being lower than the second power supply potential by the pumping portion. The second output node is supplied with a second output potential being higher than the first power supply potential by the pumping portion. The operation mode switching circuit controls a supply of potentials to the first internal node, the second internal node, the first output node and the second output node. The operation mode switching circuit supplies the second power supply potential to the second internal node and outputs the first output potential from the first internal node to the first output node in a first operation mode while supplying the first power supply potential to the first internal node and outputting the second output potential from the second internal node to the second output node in a second operation mode.

The present invention is also directed to a nonvolatile semiconductor memory device which is provided on a semiconductor substrate and comprises a nonvolatile semiconductor element, a charge pump circuit. The nonvolatile semiconductor element has a control gate and a floating gate. The charge pump circuit supplies prescribed potentials to the nonvolatile semiconductor element for storage and erase operations.

The charge pump circuit includes a first power supply node receiving a first power supply potential, a second power supply node receiving a second power supply potential being lower than the first power supply potential, a pumping portion having a first and a second internal nodes, driven by a clock signal and rendering the potential of the second internal node higher than that of a first internal node. The pumping portion has a first and a second internal nodes, and is driven by a clock signal and renders the potential of the second internal node higher than that of a first internal node. The pumping portion has a first poly-diode element so provided as to have a forward direction from the first internal node toward the second internal node, a second poly-diode element having the forward direction and serially connected to the first poly-diode element, and a capacitor having a first electrode being connected to a connection node between the first and second poly-diode elements and a second electrode being supplied with the clock signal. The charge pump circuit further includes a first output node supplied with a first output potential being lower than the second power supply potential by the pumping portion, a second output node supplied with a second output potential being higher than the first power supply potential by the pumping portion, a operation mode switching circuit controlling a supply of potentials to the first internal node, the second internal node, the first output node and the second output node. The operation mode switching circuit supplies the second power supply potential to the second internal node and outputs the first output potential from the first internal node to the first output node in a first operation mode while supplying the first power supply potential to the first internal node and outputting the second output potential from the second internal node to the second output node in a second operation mode.

Accordingly, a principal advantage of the present invention resides in that a charge pump circuit capable of generating positive and negative potentials can be implemented without remarkably changing a fabrication process therefor from that for a conventional flash memory or the like by employing poly-diode elements which are improved in performance, whereby an occupied area in a chip can be reduced.

Another advantage of the present invention resides in that a capacitor necessary for charge pumping can be readily formed in a nonvolatile semiconductor memory device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates the relation between operating states of the charge pump circuit 40 shown in FIG. 3 and ON/OFF states of switches SW1 to SW4;

FIG. 6 illustrates the relation between the operating states of the charge pump circuit 40 shown in FIG. 5 and respective control input signals;

FIG. 39 illustrates the relation between operating states of the charge pump circuit shown in FIG. 38 and respective control input signals;

FIG. 43 illustrates the relation between operating states of the charge pump circuit shown in FIG. 40 and respective control input signals;

DESCRIPTION OF THE PREFERRED EMBODIMENTS

Figure 1:
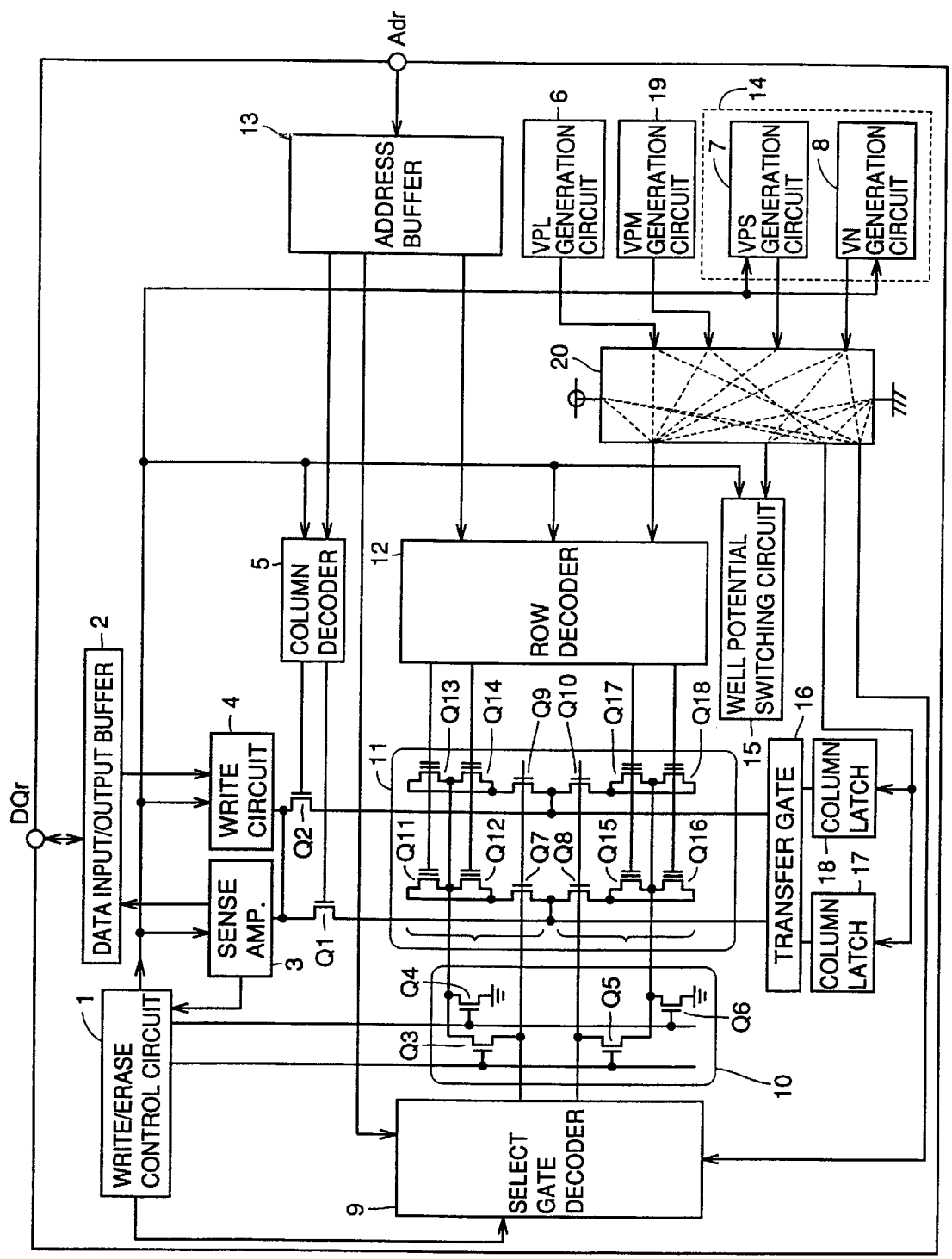
FIG. 1 is a block diagram showing the structure of a semiconductor device comprising a charge pump circuit according to an embodiment 1 of the present invention.

Embodiments of the present invention are now described in detail with reference to the drawings. Referring to the drawings, identical numerals denote the same or corresponding parts.

[Embodiment 1]

FIG. 1 is a block diagram showing the structure of a semiconductor device comprising a charge pump circuit according to an embodiment 1 of the present invention.

The semiconductor device shown in FIG. 1 is a flash memory, for example, provided with a memory cell array 11 which is simplified into a structure of two columns by two rows for simplifying the illustration.

A write/erase control circuit 1 controls timings of write and erase operations and voltages in the respective operations. A data input/output buffer 2 outputs data outputted from a sense amplifier 3 to a data terminal DQr or outputs write data inputted from the data terminal DQr to a write circuit 4.

The sense amplifier 3 amplifies data of any memory cell in the memory cell array 11 inputted through Y gate transistors Q1 and Q2 and outputs the same to the data input/output buffer 2.

The write circuit 4 supplies the data inputted from the data input/output buffer 2 to column latches 17 and 18. A column decoder 5 receives an output from an address buffer 13 and selects the Y gate transistors Q1 and Q2. A VPM generation circuit 19 supplies a voltage of 5 to 9 V to the column latches 17 and 18, which in turn supply the voltage of 5 to 9 V to a bit line in response to data "0".

A VN generation circuit 8 supplies a voltage of −11 V to a word line and a row decoder 12 in the write operation and to a P well and a source of a selected memory cell in the erase operation.

A select gate decoder 9 receives an output from the address buffer 13 and selects selector gates Q7 to Q10 in the memory cell array 11. A source line driver 10 includes N-channel MOS transistors Q3 to Q6. The source line driver 10 applies a voltage of the ground level to a source line of any memory cell in the read operation, while applying a negative voltage in the erase operation.

The memory cell array 11 includes memory cells Q11 to Q18 and the selector gates Q7 to Q10. In this memory cell array 11, data is written or erased in any memory cell selected by the row decoder 12 and the column decoder 5. The row decoder 12 receives the output from the address buffer 13 and selects a prescribed word line. The address buffer 13 receives an address signal for selecting a prescribed memory cell in the memory cell array 11 from an address terminal Adr, and outputs a column address signal and a row address signal to the column decoder 5 and the row decoder 12 respectively.

A well potential switching circuit 15 applies a negative high voltage to the P well in the memory cell erase operation, and grounds the P well in other operation modes.

A transfer gate 16 controls connection between the column latches 17 and 18 and bit lines. The column latches 17 and 18 latch the write operation.

A VPS generation circuit 7 supplies a voltage of 6 V to the row decoder 12 in OP recovery. The row decoder 12 supplies the voltage of 6 V to the word line at this time.

The VPM generation circuit 19, the VN generation circuit 8, the VPS generation circuit 7 and a VPL generation circuit 6 generate voltages, which are inputted in a switching circuit 20 and supplied to the row decoder 12, the select gate decoder 9, the column latches 17 and 18 and the well potential switching circuit 15 in response to respective operation modes.

The semiconductor device shown in FIG. 1 is different from the conventional one in a point that the VPS generation circuit 7 and the VN generation circuit 8 which are not simultaneously used are integrated into a positive/negative voltage generation circuit 14.

Figure 2:
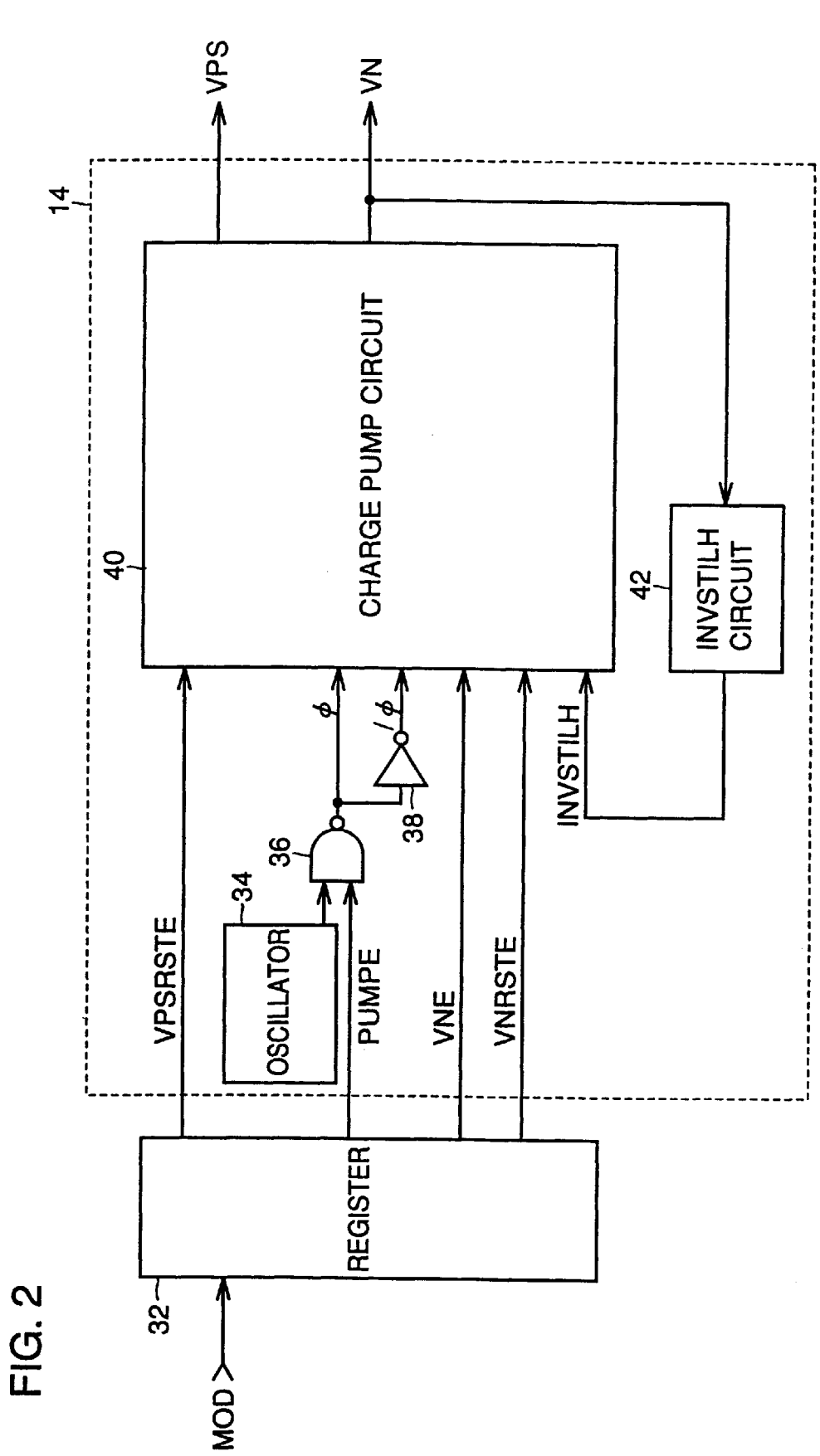
FIG. 2 is a block diagram for illustrating the structure of a positive/negative voltage generation circuit 14 shown in FIG. 1.

FIG. 2 is a block diagram showing the structure of the positive/negative voltage generation circuit 14 shown in FIG. 1.

Referring to FIG. 2, the positive/negative potential generation circuit 14 receives control signals VPSRSTE, PUMPE, VNE and VNRSTE which are responsive to an operation mode set signal MOD from a register 32 provided on an output part of the write/erase control circuit 1, and generates a positive potential VPS or a negative potential VN.

The positive/negative potential generation circuit 14 includes an oscillator 34 generating a source signal for a clock signal φ, a NAND circuit 36 receiving the output of the oscillator 34 and the control signal PUMPE and generating the clock signal φ, an invertor 38 receiving and inverting the clock signal φ and generating a clock signal /φ, a charge pump circuit 40 receiving the control signals VPSRSTE, VNE, VNRSTE and INVSTILH and the clock signals φ and /φ and generating the positive potential VPS and the negative potential VN, and an INVSTILH circuit 42 monitoring the level of the negative potential VN and generating a control signal INVSTILH.

Figure 3:
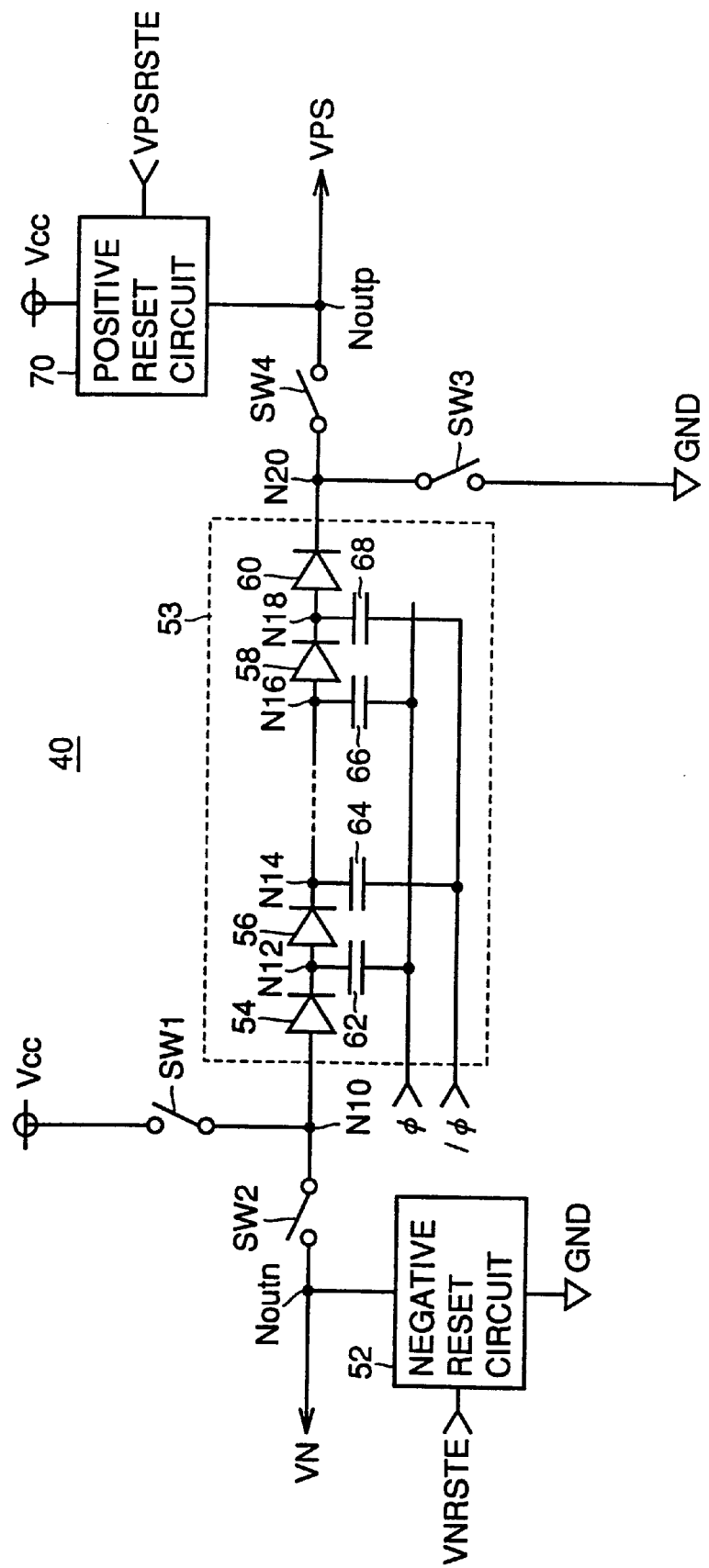
FIG. 3 is an equivalent circuit diagram for illustrating operations of a charge pump circuit 40 shown in FIG. 2.

FIG. 3 is an equivalent circuit diagram for illustrating operations of the charge pump circuit 40 shown in FIG. 2.

Referring to FIG. 3, the charge pump circuit 40 includes a negative reset circuit 52 connecting a ground potential GND with an output node Noutn outputting the negative potential VN in response to the control signal VNRSTE, a switch SW2 connected between the output node Noutn and a node N10, a switch SW1 connected between a power supply potential Vcc and the node N10, a voltage generation part 53 generating a potential difference between the node N10 and a node N20, a switch SW3 connected between the ground potential GND and the node N20, and a positive reset circuit 70 connecting the power supply potential Vcc with an output node Noutp outputting the positive potential VPS in response to the control signal VPSRSTE.

The voltage generation part 53 includes a diode 54 having an anode and a cathode which are connected to the node N10 and a node N12 respectively, a diode 56 having an anode and a cathode which are connected to the node N12 and a node N14 respectively, a diode 58 having an anode and a cathode which are connected to nodes N16 and N18 respectively, a diode 60 having an anode and a cathode which are connected to the nodes N18 and N20 respectively, a capacitor 62 connected between a clock node which is supplied with the clock signal φ and the node N12, a capacitor 64 connected between a complementary clock node which is supplied with the clock signal /φ, complementary to the clock signal φ, and the node N14, a capacitor 66 connected between the clock node and the node N16, and a capacitor 68 connected between the complementary clock node and the node N18.

Serially connected diodes of a stage number corresponding to the required voltages, are provided between the nodes N14 and N16. Also, capacitors corresponding to the diodes are provided.

The operations of the charge pump circuit 40 are now briefly described.

FIG. 4 illustrates the relation between operating states of the charge pump circuit 40 shown in FIG. 3 and ON/OFF states of the switches SW1 to SW4.

Referring to FIGS. 3 and 4, the switches SW1 and SW2 are set in ON and OFF states respectively when using the positive potential VPS, whereby the node N10 is supplied with the power supply potential Vcc. On the other hand, the switches SW4 and SW3 are set in ON and OFF states respectively, whereby the node N20 is connected with the output node Noutp. The control signal VNRSTE activates the negative reset circuit 52, to supply the ground potential GND to the output node Noutn. The control signal VPSRSTE inactivates the positive reset circuit 70, to supply the potential of the node N20 to the output node Noutp.

When the clock signals φ and /φ are inputted, a voltage responsive to the amplitude of the clock signals φ and /φ and the stage number of the diodes 54 to 60 is generated by a charge pump operation, to cause a constant potential difference between the nodes N1 and N20. Since the node N10 is supplied with the power supply potential Vcc, the potential of the node N20 reaches a constant level which is higher than that of the power supply potential Vcc, to obtain the positive potential VPS.

When using the negative potential VN, on the other hand, the switches SW3 and SW4 are set in ON and OFF states respectively, whereby the node N20 is supplied with the ground potential GND. The switches SW2 and SW1 are set in ON and OFF states respectively, whereby the node N10 is connected with the output node Noutn. The control signal VPSRSTE activates the positive reset circuit 70, to supply the power supply potential Vcc to the output node Noutp. The control signal VNRSTE inactivates the negative reset circuit 52, to supply the potential of the node N10 to the output node Noutn.

When the clock signals φ and /φ are inputted, a voltage responsive to the amplitude of the clock signals φ and /φ and the stage number of the diodes 54 to 60 is generated by a charge pump operation, to cause a constant potential difference between the nodes N10 and N20. Since the node N20 is supplied with the ground potential GND, the potential of the node N10 reaches a constant level which is lower than that of the ground potential GND, to obtain the negative potential VN.

Figure 5:
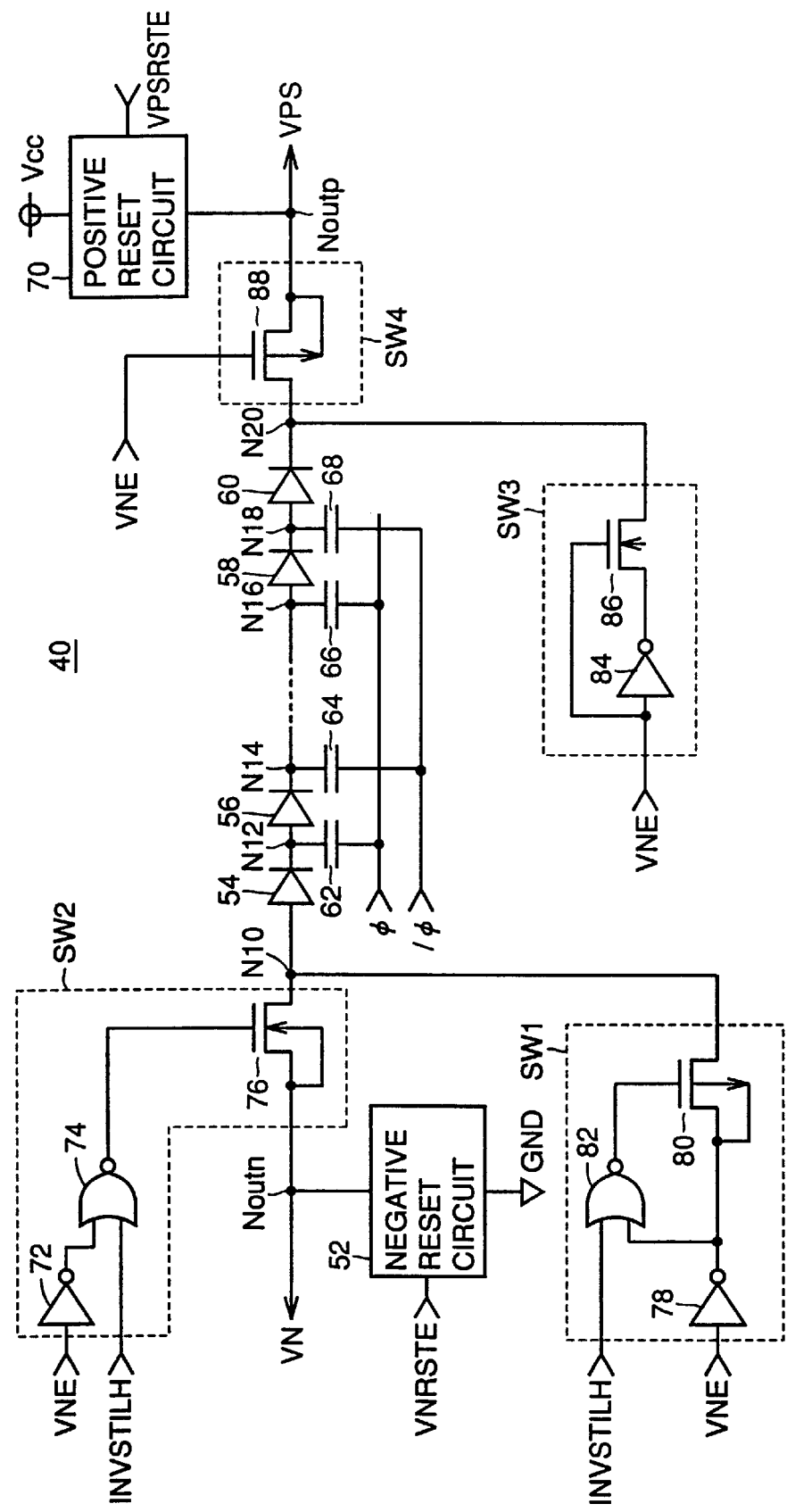
FIG. 5 is a circuit diagram for illustrating the circuit structure of the charge pump circuit 40 shown in FIG. 3.

FIG. 5 is a circuit diagram for illustrating the circuit structure of the charge pump circuit 40 shown in FIG. 3.

Referring to FIG. 5, the switch SW1 includes an invertor 78 receiving and inverting the control signal VNE, a NOR circuit 82 receiving an output of the invertor 78 and the control signal INVSTILH, and a P-channel MOS transistor 80 receiving an output of the NOR circuit 82 in its gate and connecting an output node of the invertor 78 with the output node Noutn. A back gate of the P-channel MOS transistor 80 is connected with the output node of the invertor 78.

The switch SW2 includes an invertor 72 receiving and inverting the control signal VNE, a NOR circuit 74 receiving an output of the invertor 72 and the control signal INVSTILH, and an N-channel MOS transistor 76 receiving an output of the NOR circuit 74 in its gate and connecting the node N10 with the output node Noutn. A back gate of the N-channel MOS transistor 76 is connected with the output node Noutn.

The switch SW4 includes a P-channel MOS transistor 88, which is connected between the node N20 and the output node Noutp, receiving the control signal VNE in its gate. A back gate of the P-channel MOS transistor 88 is connected with the output node Noutp.

The switch SW3 includes an invertor 84 receiving and inverting the control signal VNE, and a N-channel MOS transistor 86 receiving the control signal VNE in its gate and connecting an output node of the invertor 84 with the output node Noutn.

The remaining structure is identical to that shown in FIG. 3, and hence description thereof is not repeated.

FIG. 6 illustrates the relation between operating states of the charge pump circuit 40 shown in FIG. 5 and the respective control signals.

Referring to FIG. 6, the control signals VNE, INVSTILH, VPSRSTE and VNRSTE are set at a low level, a low level, a low level (inactive) and a high level (active) respectively when the charge pump circuit 40 uses the positive potential VPS.

When the charge pump circuit 40 uses the negative potential VN, on the other hand, the control signals VNE, INVSTILH, VPSRSTE and VNRSTE are set at a high level, a low level→a high level, a high level (active) and a low level (inactive) respectively.

The set conditions shown in FIG. 6 are now described with reference to an operation waveform diagram.

Figure 7:
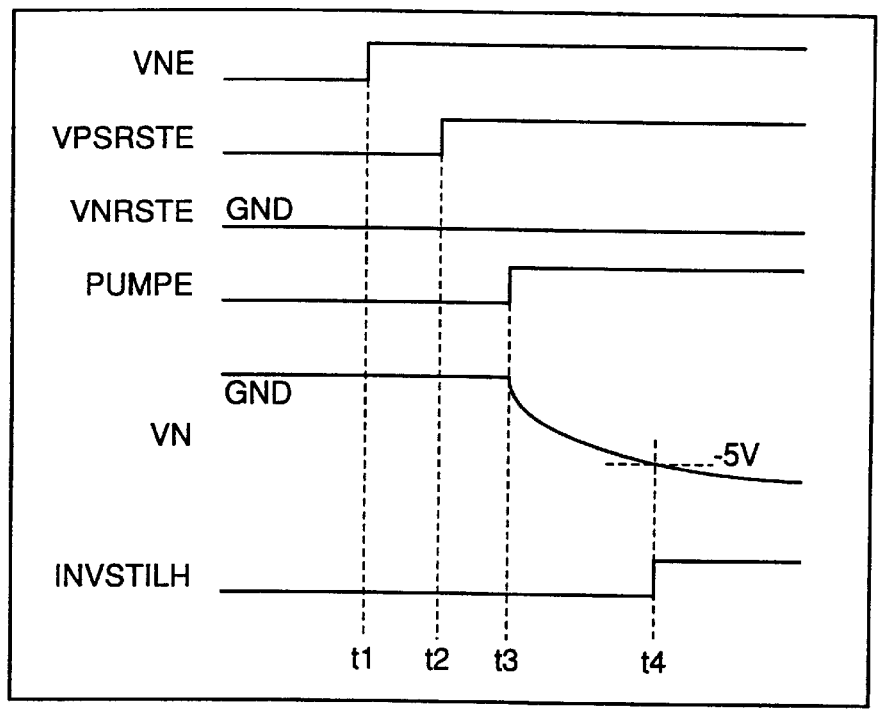
FIG. 7 is an operation waveform diagram for illustrating the operation of the charge pump circuit 40 for generating a negative voltage VN.

FIG. 7 is an operation waveform diagram for illustrating the operation of the charge pump circuit 40 shown in FIG. 5 for generating the negative potential VN.

Referring to FIGS. 5 and 7, the control signal VNE rises from a low level to a high level at a time t1, thereby switching the switches SW1 to SW4 to states for outputting the negative potential VN.

The control signal VPSRSTE rises from a low level to a high level at a time t2, for activating the positive reset circuit 70. The potential of the output node Noutp reaches the power supply potential Vcc, so that the output node Noutp enters a reset state.

On the other hand, the control signal VNRSTE is maintained at the ground potential GND, the negative reset circuit 52 enters an inactive state and the output node Noutn is released from a reset state.

At a time t3, the control signal PUMPE is activated and the clock signal φ generated from the source signal outputted from the oscillator 34 is inputted in the charge pump circuit 40. The charge pump circuit 40 receiving the clock signals φ and /φ is activated and the potential of the output node Noutn starts to gradually reduce.

At a time t4, the negative potential VN of the output node Noutn reaches −5 V, whereby the INVSTILH circuit 42 converts the control signal INVSTILH from a low level to a high level.

After a lapse of a constant time from the time t4, the negative potential VN is stabilized at a constant level.

Figure 8:
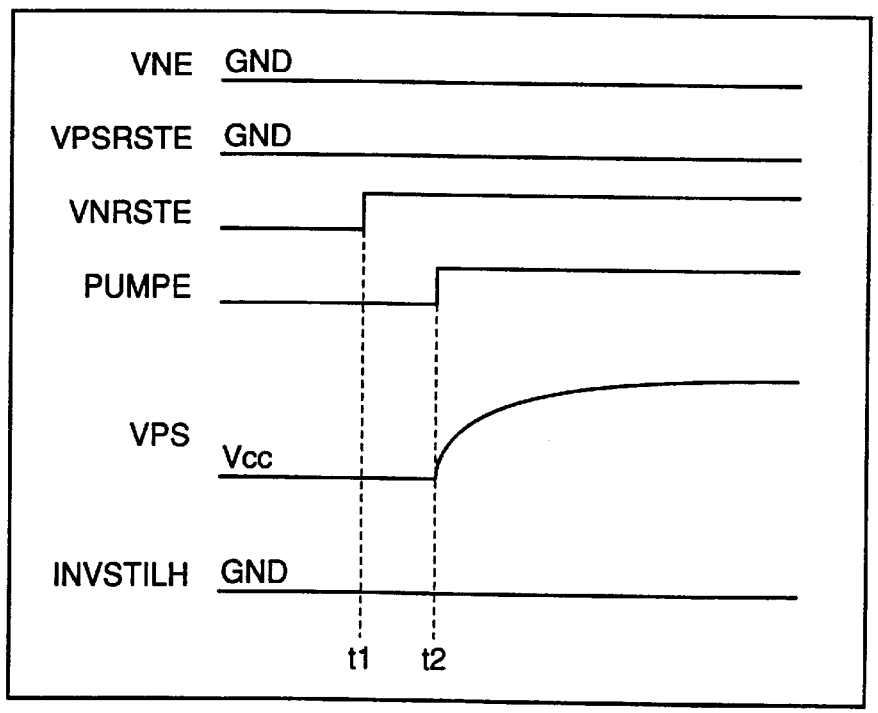
FIG. 8 is an operation waveform diagram for illustrating the operation of the charge pump circuit 40 for generating a positive voltage VPS.

FIG. 8 is an operation waveform diagram for illustrating the operation of the charge pump circuit 40 shown in FIG. 5 for generating the positive potential VPS.

Referring to FIGS. 5 and 8, the control signal VNE is set at the ground potential GND for switching the switches SW1 to SW4 to states for outputting the positive potential VPS. The control signal VPSRSTE is set at the ground potential GND for inactivating the positive reset circuit 70 and releasing the output node Noutp from a reset state.

At a time t1, the control signal VNRSTE rises from a low level to a high level, for activating the negative reset circuit 52 and resetting and fixing the output node Noutn at the ground potential GND.

At a time t2, the control signal PUMPE is activated to input the clock signal φ in the charge pump circuit 40. The positive potential VPS of the output node Noutp gradually increases from the power supply potential Vcc. After a lapse of a constant time, the positive potential VPS is stabilized at a prescribed level.

The control signal INVSTILH remains at a low level during the aforementioned operation.

Figure 9:
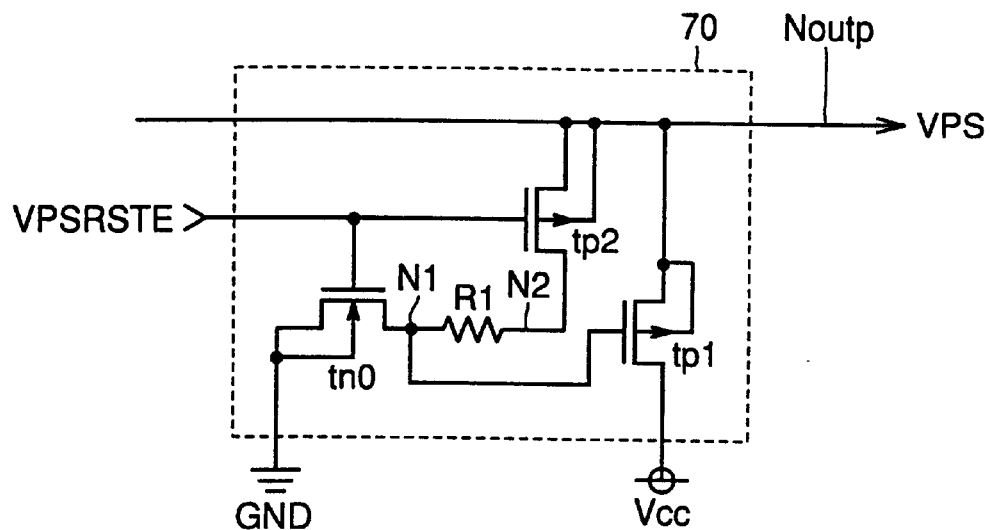
FIG. 9 is a circuit diagram showing the structure of a positive reset circuit 70 shown in FIG. 5.

FIG. 9 is a circuit diagram showing the structure of the positive reset circuit 70 shown in FIG. 5.

Referring to FIG. 9, the positive reset circuit 70 includes a P-channel MOS transistor tp2, a resistor R1 and an N-channel MOS transistor tn0 which are serially connected between the output node Noutp and the ground potential GND, and a P-channel MOS transistor tp1, which is connected between the output node Noutp outputting the positive potential VPS and the power supply potential Vcc, having a gate connected to a node N1. The node N1 is the connection node between the resistor R1 and the N-channel MOS transistor tn0.

The gates of the N-channel MOS transistor tn0 and the P-channel MOS transistor tp2 receive the control signal VPSRSTE.

Back gates of the N-channel MOS transistor tn0 is connected to the ground potential GND. Back gate of the P-channel MOS transistors tp1 and tp2 are both connected to the output node Noutn.

Figure 10:
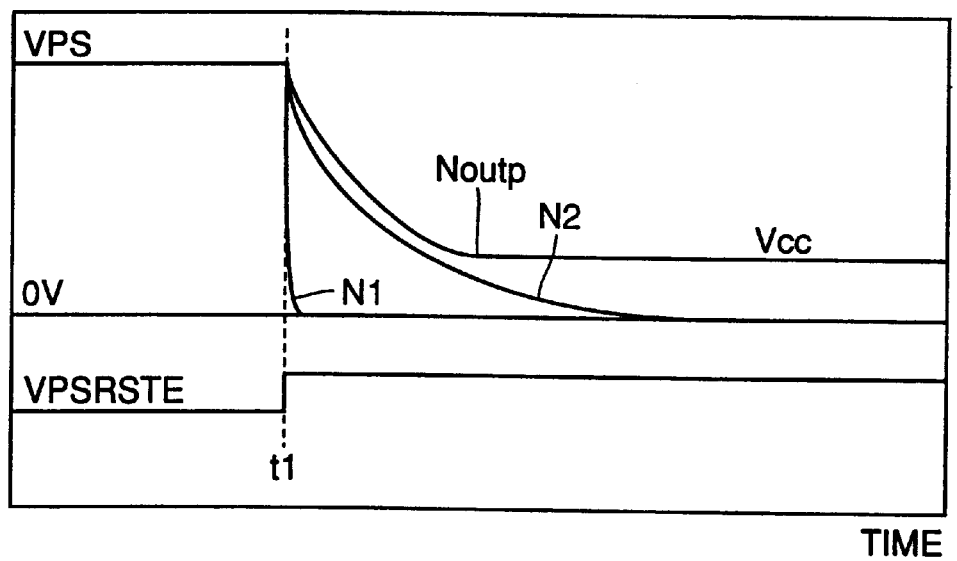
FIG. 10 is an operation waveform diagram for illustrating the operation of the positive reset circuit 70 shown in FIG. 9.

FIG. 10 is an operation waveform diagram for illustrating the operation of the positive reset circuit 70 shown in FIG. 9.

Referring to FIGS. 9 and 10, the N-channel MOS transistor tn0 enters a conducting state and the potential of the node N1 quickly falls from the high potential VPS to 0 V when the control signal VPSRSTE rises at a time t1. Then, the P-channel MOS transistor tp1 enters a conducting state and the potential of the output node Noutp starts to reduce from the high potential VPS to the power supply potential Vcc. The P-channel MOS transistor tp2 remains in a conducting state until the potential of the output node Noutp sufficiently reduces, whereby the potential of a node N2 reduces following the potential of the output node Noutp.

When the potential of the output node Noutp reduces to some extent, the P-channel MOS transistor tp2 enters a non-conducting state, and the potential of the node N2 further reduces toward the ground potential GND.

After a lapse of a sufficient time, the potential of the output node Noutp reaches the power supply potential Vcc and that of the node N2 reaches the ground potential GND and are stabilized respectively, so that the output node Noutp is reset.

Figure 11:
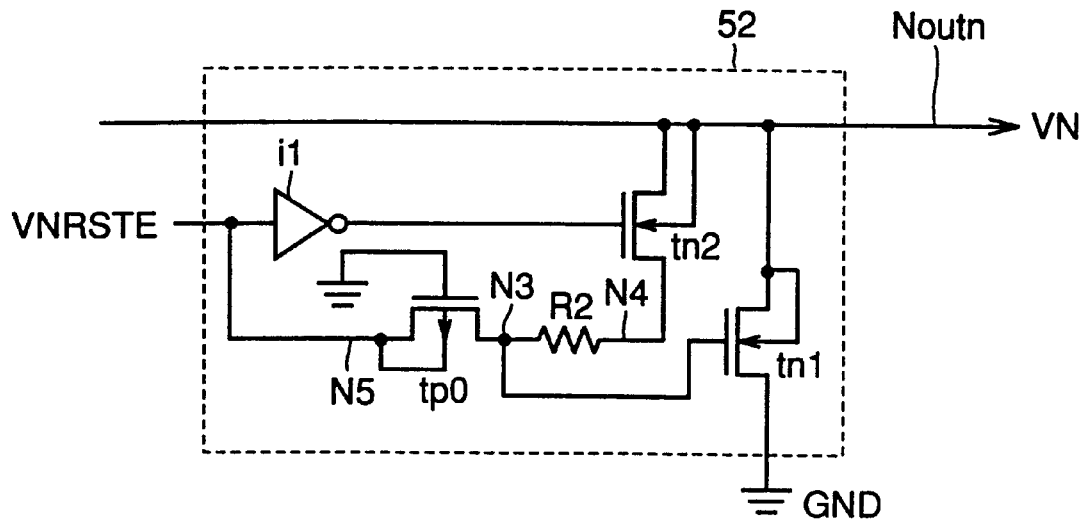
FIG. 11 is a circuit diagram showing the structure of a negative reset circuit 52 shown in FIG. 5.

FIG. 11 is a circuit diagram showing the structure of the negative reset circuit 52 shown in FIG. 5.

Referring to FIG. 11, the negative reset circuit 52 includes an invertor i1 receiving and inverting the control signal VNRSTE which is input to a node N5, an N-channel MOS transistor tn2, a resistor R2 and a P-channel MOS transistor tp0 which are serially connected between the output node Noutn and the node N5, and an N-channel MOS transistor tn1, which is connected between the output node Noutn outputting the negative potential VN and the ground potential GND, having a gate connected to a node N3. The node N3 is the connection node between the resistor R2 and the P-channel MOS transistor tp0.

The N-channel MOS transistor tn2 and the P-channel MOS transistor tp0 are supplied with the output signal of the inverter i1 and the ground potential GND in gates thereof respectively.

Back gate of the P-channel MOS transistor tp0 is connected to the node N5. Back gates of the N-channel MOS transistors tn1 and tn2 are both connected to the output node Noutn.

Figure 12:
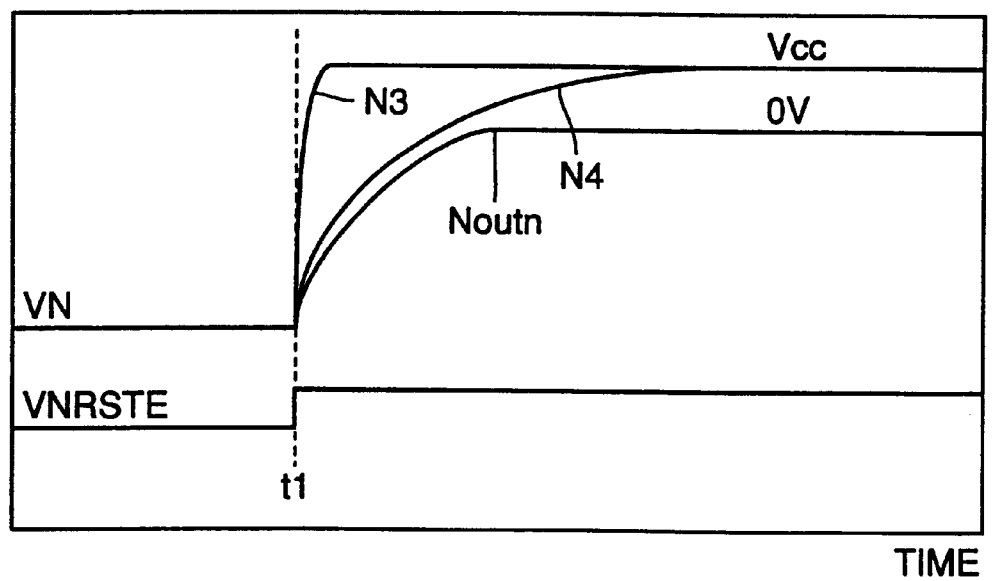
FIG. 12 is an operation waveform diagram for illustrating the operation of the negative reset circuit 52 shown in FIG. 11.

FIG. 12 is an operation waveform diagram for illustrating the operation of the negative reset circuit 52 shown in FIG. 11.

Referring to FIGS. 11 and 12, the potential of the node N5 reaches the power supply potential Vcc when the control signal VNRSTE rises at a time t1. The P-channel MOS transistor tp0 having a grounded gate enters a conducting state, and the potential of the node N3 quickly rises from the negative potential VN to the power supply potential Vcc. Then, the N-channel MOS transistor tn1 enters a conducting state and the potential of the output node Noutn starts to increase from the negative potential VN to 0 V. The N-channel MOS transistor tn2 remains in a conducting state until the potential of the output node Noutn sufficiently increases, and hence the potential of a node N4 increases following the potential of the output node Noutn.

When the potential of the output node Noutn increases to some extent, the N-channel MOS transistor tn2 enters a non-conducting state, and the potential of the node N4 further increases toward the power supply potential Vcc.

After a lapse of a sufficient time, the potentials of the output node Noutn and the node N4 reach 0 V and the power supply potential Vcc respectively and are stabilized, so that the output node Noutn is reset.

Figure 13:
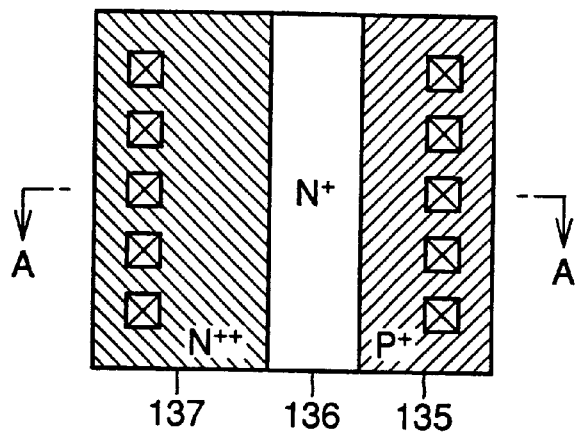
FIG. 13 is a plan view showing the structure of a poly-diode element employed as each of diodes 54 to 60 shown in FIG. 5.

FIG. 13 is a plan view showing the structure of a poly-diode element employed as each of the diodes 54 to 60 shown in FIG. 5.

Figure 14:
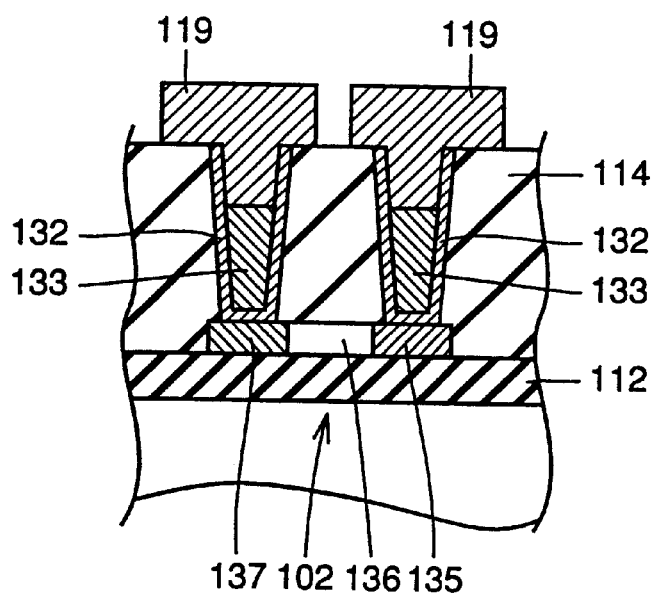
FIG. 14 is a sectional view of the poly-diode element shown in FIG. 13.

FIG. 14 is a sectional view taken along the line XIV—XIV in FIG. 13.

Referring to FIG. 14, the poly-diode element includes a P-type impurity region 135, an N-type impurity region 136 which is in contact with the P-type impurity region 135, and an N-type impurity region 137 having a concentration higher than the N-type impurity region 136. Aluminum interconnections 119 are connected to the P-type impurity region 135 and the N-type impurity region 137 through barrier metal films 132 and tungsten plugs 133 respectively.

Figure 15:
FIG. 15 is a circuit diagram showing an equivalent circuit of the poly-diode element shown in FIG. 13.

FIG. 15 is a circuit diagram showing an equivalent circuit of the poly-diode element shown in FIG. 13.

Referring to FIG. 15, resistors R are added to both sides of a PN diode for reducing a voltage directly applied to the diode by a voltage drop, so that the diode is hardly broken even if electrical noise such as surge is applied.

Figure 16:
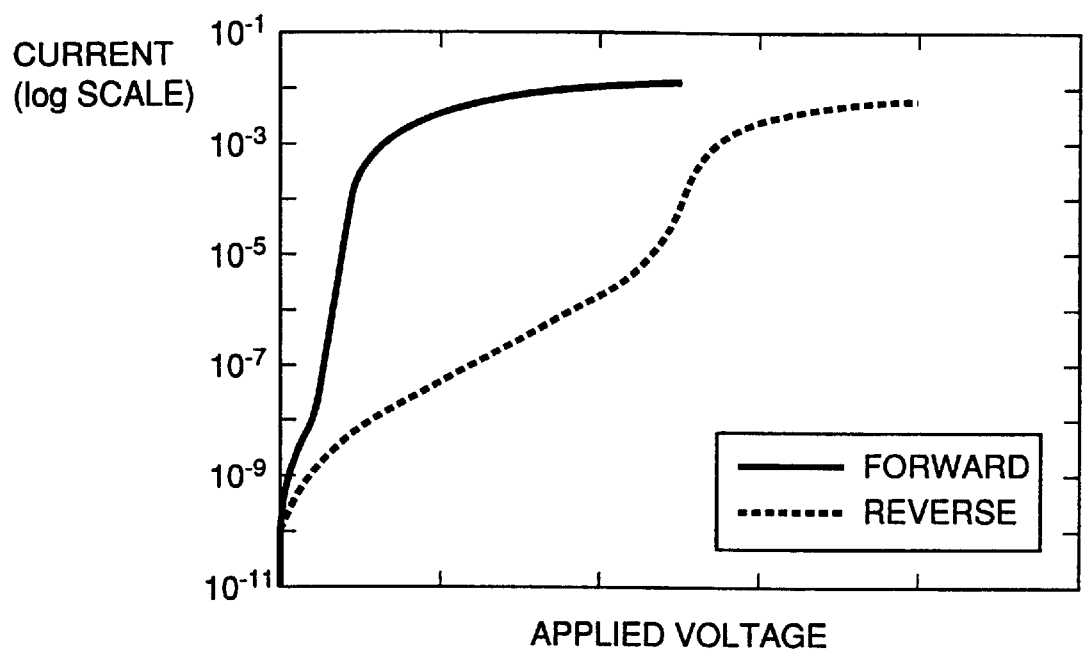
FIG. 16 illustrates the electric characteristics of the poly-diode element shown in FIG. 13.
Figure 17:
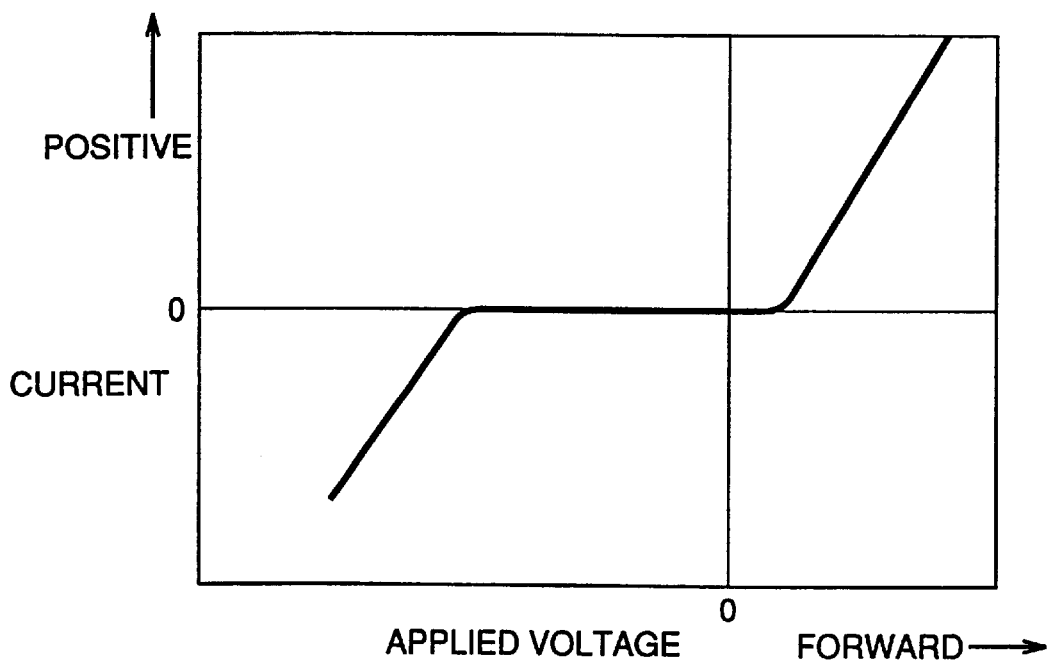
FIG. 17 illustrates the electric characteristics of the poly-diode element shown in FIG. 13.

FIGS. 16 and 17 illustrate the electric characteristics of the poly-diode element shown in FIG. 13.

FIGS. 16 and 17 show I (current)-V (voltage) characteristics of a vertical log scale and vertical linear scale respectively.

Figure 18:
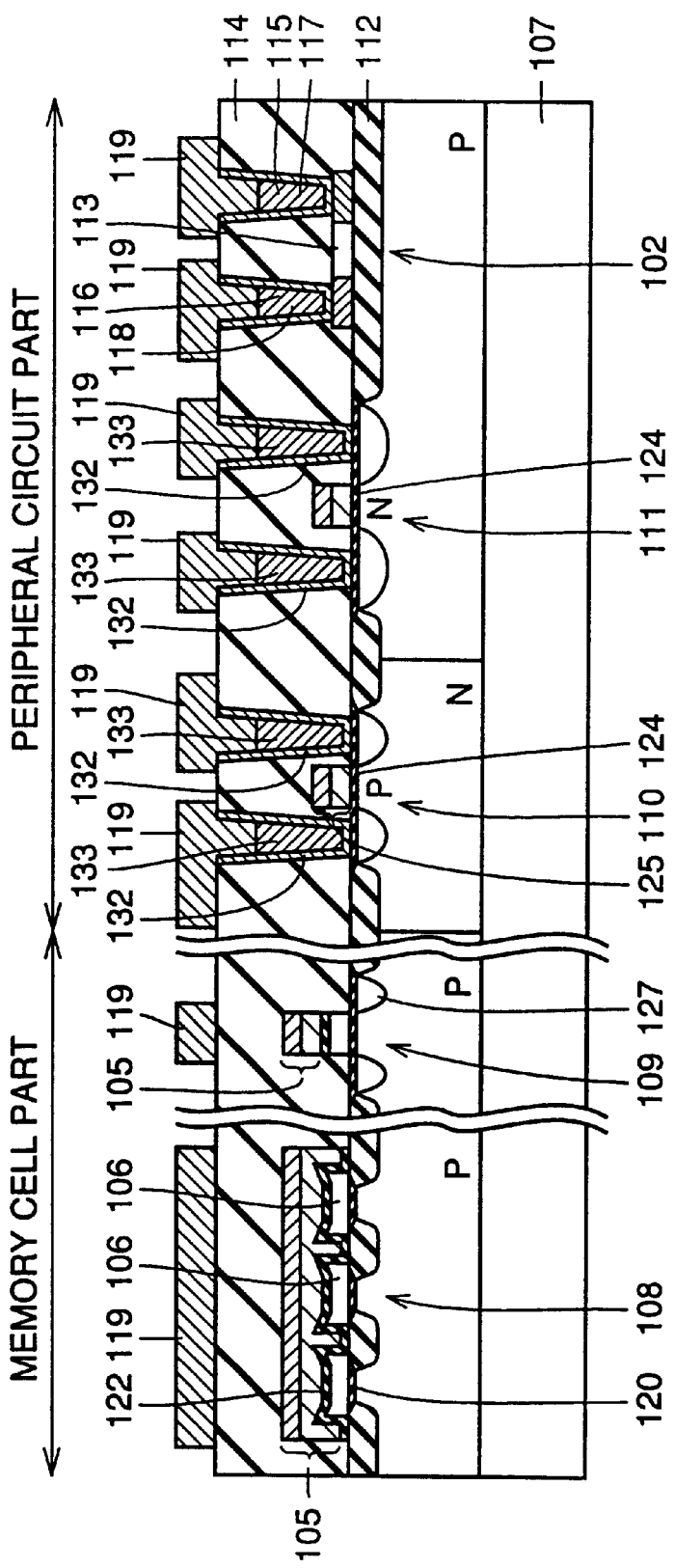
FIG. 18 is a sectional view of a semiconductor device for illustrating fabrication steps of the poly-diode element shown in FIG. 13.

FIG. 18 is a sectional view of the semiconductor device for illustrating fabrication steps for the poly-diode element shown in FIG. 13.

Referring to FIG. 18, a nonvolatile semiconductor storage element 108, a memory cell transistor 109, a peripheral PMOS transistor 110, a peripheral NMOS transistor 111 and a poly-diode element 102 are provided on a semiconductor substrate 107 (FIG. 18 shows the nonvolatile semiconductor storage element 108 and the memory cell transistor 109 in sections along a word line direction and a bit line direction respectively. This also applies to the subsequent figures).

The nonvolatile semiconductor storage element 108 includes floating gates 106 made of N-type polysilicon, an inter-poly-insulator film 122 consisting of a multilayer film of oxide films and a nitride film provided on the semiconductor substrate 107 to cover the floating gates 106, and a control gate 105 having lower and upper layers of N-type polysilicon and metal silicide respectively, which is provided to cover the floating gates 106 through the inter-poly-insulator film 122.

The poly-diode element 102 includes an element isolation oxide film 112 provided on a major surface of the semiconductor substrate 107. A PN junction polysilicon layer 113 having a P-type layer and an N-type layer is provided on the element isolation oxide film 112. An interlayer isolation film 114 is provided on the semiconductor substrate 107 to cover the PN junction polysilicon layer 113. First and second contact holes 115 are formed in the interlayer isolation film 114 for exposing the P-type layer and the N-type layer respectively.

A first resistive element 117 consisting of a barrier metal and a tungsten plug, which is connected to the P-type layer, is provided in the first contact hole 115. A second resistive element 118 consisting of a barrier metal and a tungsten plug, which is connected to the N-type layer, is provided in the second contact hole 116. A interconnection layer 119 is connected to the P-type layer through the first resistive element 117. Another interconnection layer 119 is connected to the N-type layer through the second resistive element 118.

Due to the presence of the first and second resistive elements 117 and 118, the poly-diode element 102 is resistant against electrical noise such as surge.

Steps of fabricating the poly-diode element 102 are now described.

Figure 19:
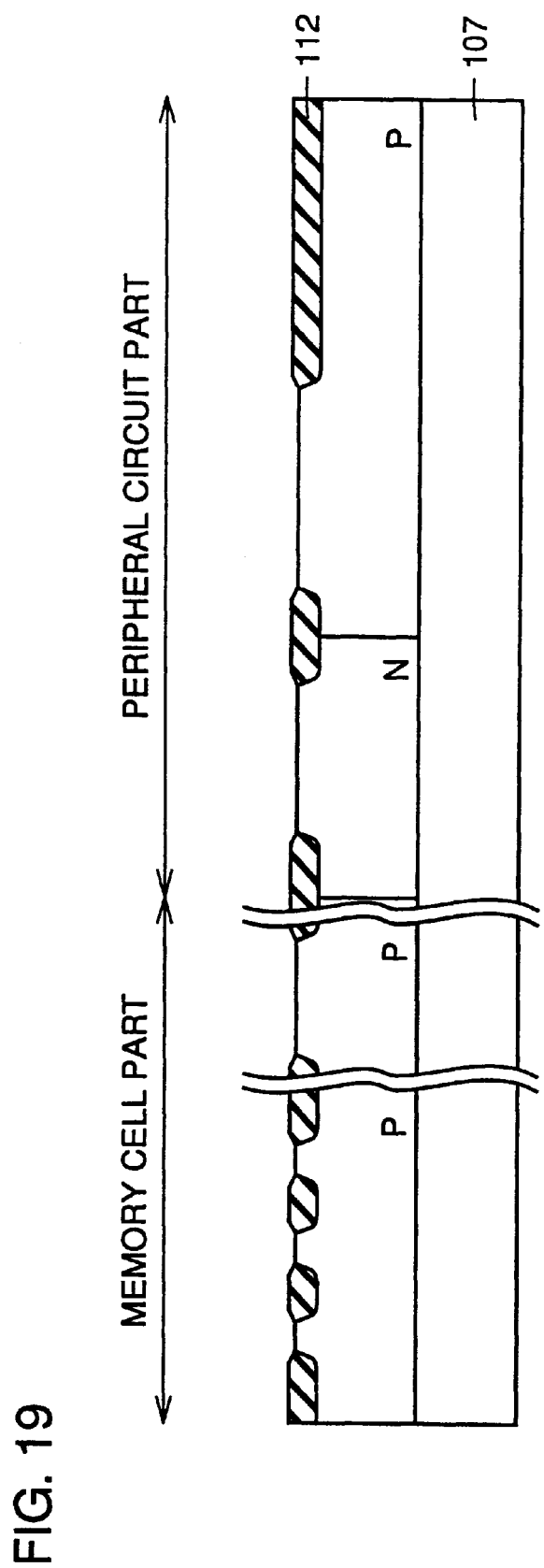
FIGS. 19 to 26 are sectional views showing first to eighth fabrication steps for the semiconductor device shown in FIG. 18 respectively.

FIG. 19 is a sectional view showing a first fabrication step for the semiconductor device shown in FIG. 18.

Referring to FIG. 19, the element isolation oxide film 112, a P well and an N well are formed on the major surface of the silicon substrate 107.

Figure 20:
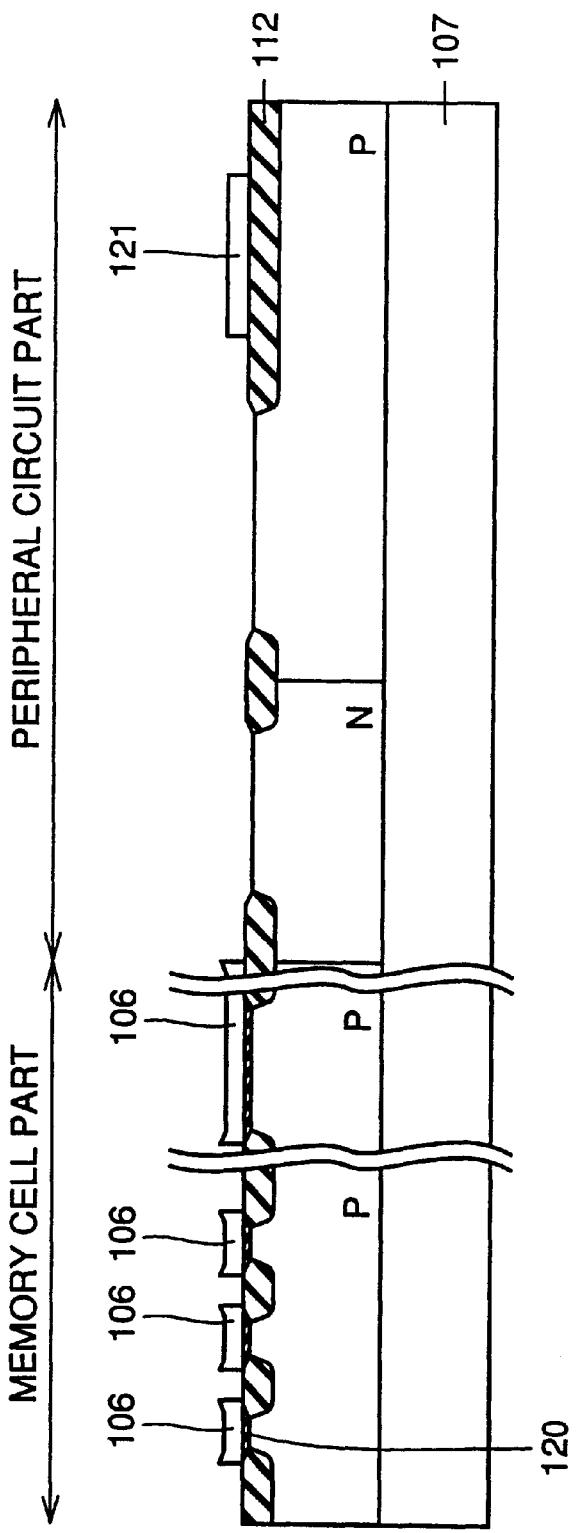

FIG. 20 is a sectional view showing a second fabrication step for the semiconductor device shown in FIG. 18.

Referring to FIG. 20, a tunnel oxide film 120 of a memory cell is formed by thermal oxidation. Phosphorus-doped N-type polycrystalline silicon (hereinafter referred to as a floating gate material) having phosphorus concentration of about $1 \times 10^{20}$ atoms/cm$^3$ (available in the range of $5 \times 10^{19}$ atoms/cm$^3$ to $2 \times 10^{20}$ atoms/cm$^3$) is deposited by low-pressure CVD in a thickness of about 100 nm.

The floating gate material is etched through photolithography and worked into stripes along the bit line direction in a memory cell array, thereby obtaining the floating gates 106. In a peripheral circuit part, the floating gate material is worked into the form of a base portion 121 for the poly-diode element 102. The remaining parts of the floating gate material are entirely removed.

Figure 21:
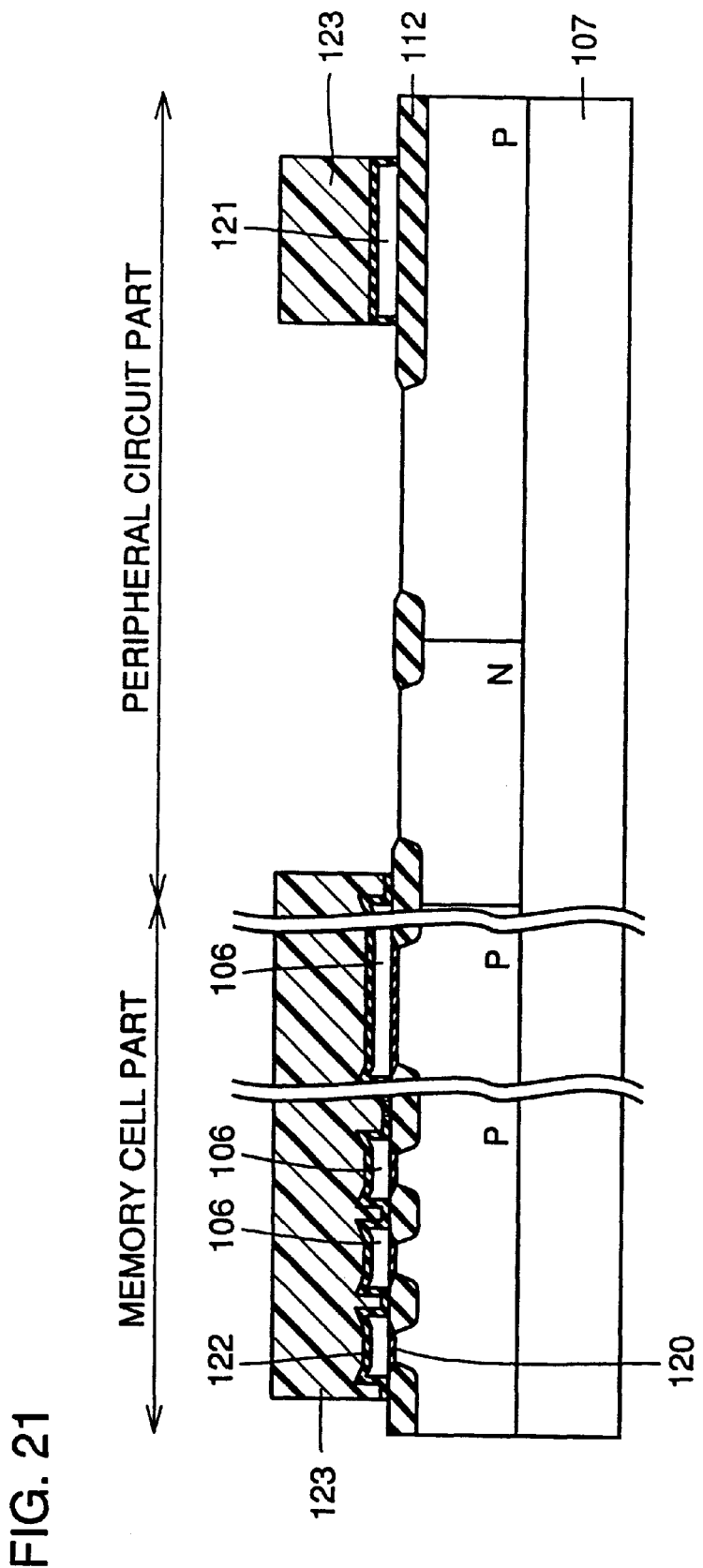

FIG. 21 is a sectional view showing a third fabrication step for the semiconductor device shown in FIG. 18.

Referring to FIG. 21, an inter-poly-insulator film (three-layer structure of an oxide film, a nitride film and an oxide film having a thickness of about 150 to 200 nm in terms of the oxide films) 122 is formed to cover the floating gates 106. Thereafter the inter-poly-insulator film 122 is partially removed from the peripheral circuit part excluding the base portion 121 through photolithography with a resist film 123.

Figure 22:
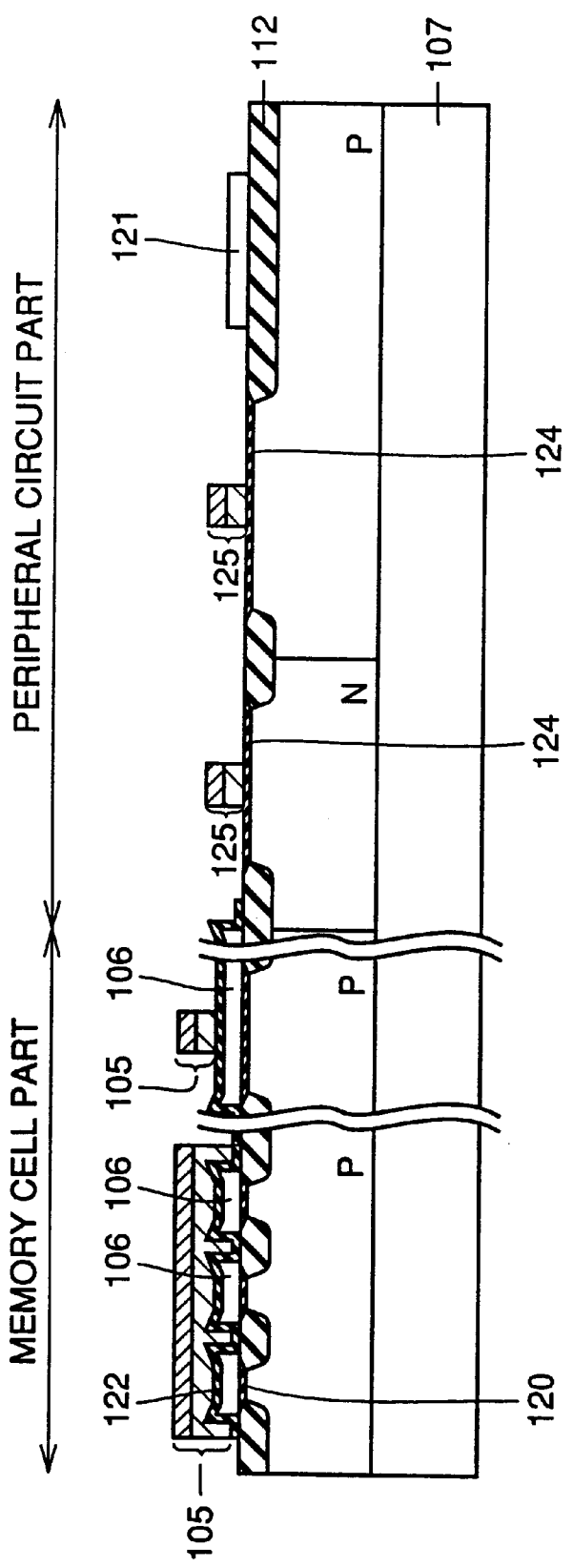

FIG. 22 is a sectional view showing a fourth fabrication step for the semiconductor device shown in FIG. 18.

Referring to FIGS. 21 and 22, the resist film 123 is removed and thereafter gate oxide films 124 for the peripheral MOS transistors 110 and 111 are formed by thermal oxidation. Thereafter the inter-poly-insulator film 122 is removed also from the base portion 121 for the poly-diode element 102.

Then, a control gate material of tungsten polycide (tungsten silicide and phosphorus-doped N-type polycrystalline silicon of 100 nm and 100 nm in thickness) is deposited and etched through photolithography for forming the control gates 105 in the memory cell part while forming peripheral circuit MOS transistor gates 125 in the peripheral circuit part. A part of the control gate material deposited on the base portion 121 for the poly-diode element 102 is removed at this time.

Figure 23:
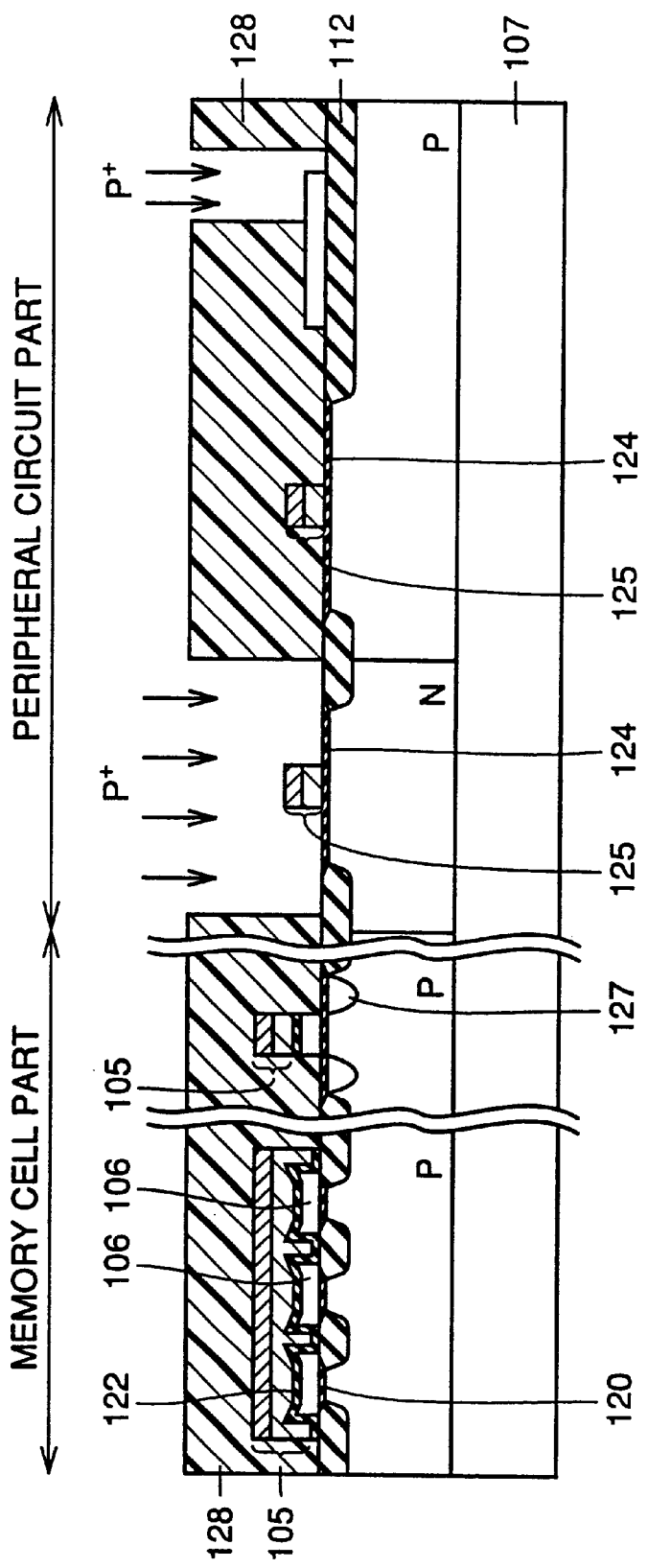

FIG. 23 is a sectional view showing a fifth fabrication step for the semiconductor device shown in FIG. 18.

Referring to FIGS. 22 and 23, the control gate 105 is employed as a mask for etching the inter-poly-insulator film 122 and the floating gate 106 provided under the same in the memory cell. Thereafter source/drain regions 127 of the memory cell are formed by ion implantation, thereby completing the memory cell.

A resist pattern 128 is formed to cover the memory cell part and the NMOS transistor 111 part, for implanting $BF_2$ ions also into a partial region of the base portion 121 for the poly-diode element 102 by about 2 to $4 \times 10^{15}$ atoms/cm$^2$ at about 20 KeV in P$^+$ implantation (boron or BF$_2$) for forming a P$^+$ diffusion layer of the peripheral PMOS transistor 110. The implanted region is inverted from the N type to the P type, and forms a PN junction.

The resist pattern 128 is removed.

Figure 24:
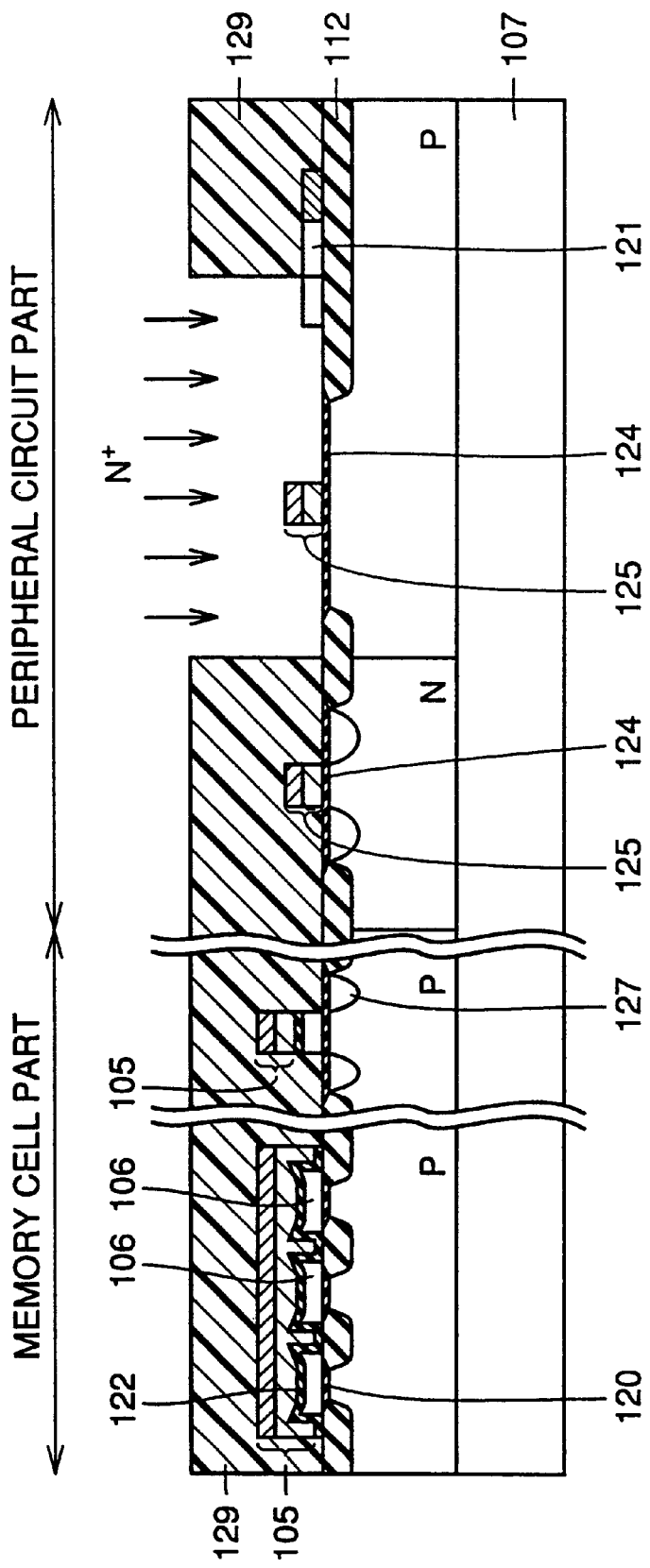

FIG. 24 is a sectional view showing a sixth fabrication step for the semiconductor device shown in FIG. 18.

Referring to FIG. 24, a resist pattern 129 is formed on the silicon substrate 107 to cover the memory cell part, the peripheral PMOS transistor 110 part and a part of the base portion 121 for the poly-diode element 102. The resist pattern 129 is employed as a mask for implanting As ions into a partial region of the base portion 121 for the poly-diode element 102 by about 2 to $4 \times 10^{15}$ atoms/cm$^2$ at about 50 KeV in N$^+$ implantation (arsenic or phosphorus) for forming an N$^+$ diffusion layer of the peripheral NMOS transistor 111, thereby reducing transverse resistance of the N-type region.

Figure 25:
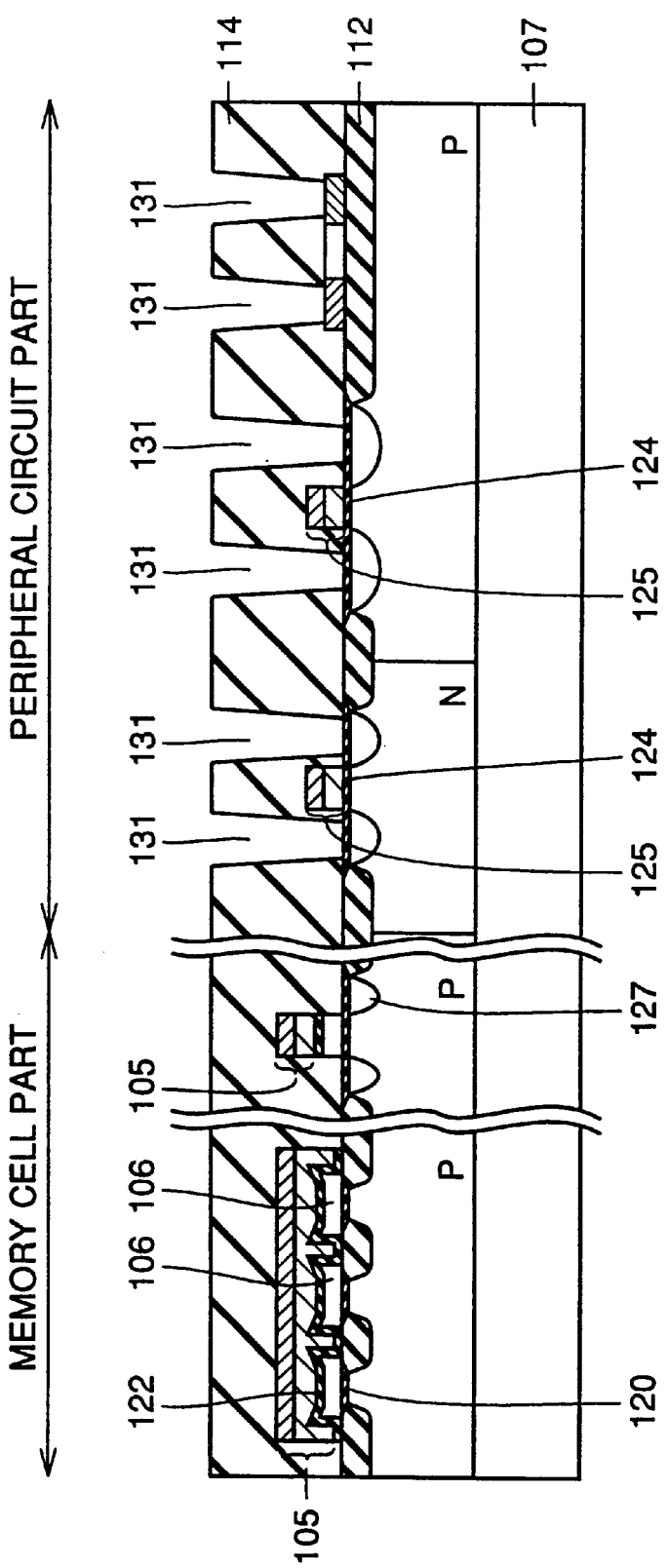

FIG. 25 is a sectional view showing a seventh fabrication step for the semiconductor device shown in FIG. 18.

Referring to FIG. 25, the interlayer isolation film 114 is formed on the silicon substrate 107 and contact holes 131 are formed in this interlayer isolation film 114 through photolithography and etching for exposing surfaces of source/drain regions of the PMOS and NMOS transistors 110 and 111 and the N and P surfaces of the poly-diode element 102.

Figure 26:
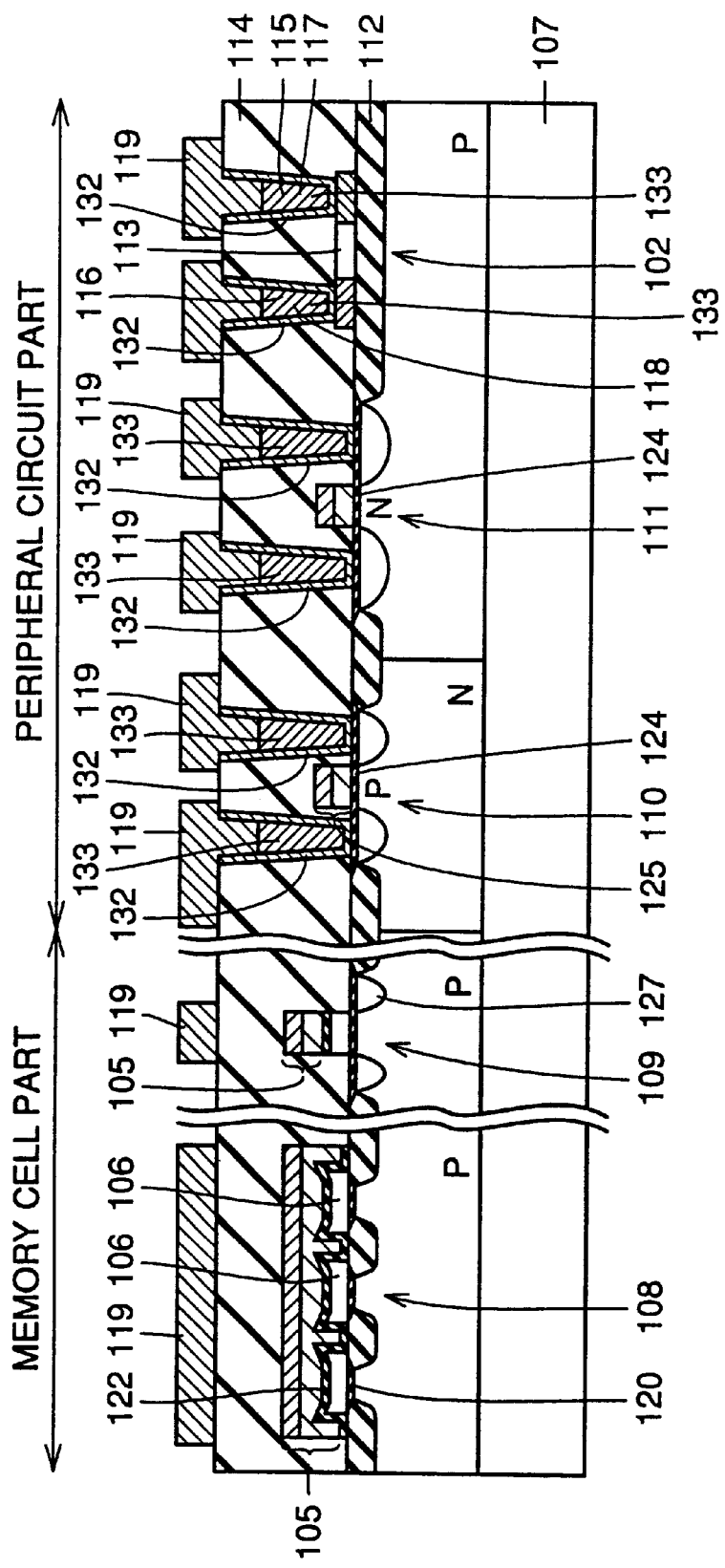

FIG. 26 is a sectional view showing an eighth fabrication step for the semiconductor device shown in FIG. 18.

Referring to FIGS. 25 and 26, barrier metal films 132 consisting of TiSi$_2$ and TiN are formed to cover bottom surfaces and side walls of the contact holes 131. A tungsten film is deposited on the overall upper surface of the silicon substrate 107 by CVD. The obtained tungsten film is entirely etched thereby embedding tungsten plugs 133 in the contact holes 131. Thus, the poly-diode element 102 is completed. Then, an aluminum wiring material is deposited on the silicon substrate 107 for forming the aluminum interconnections 119 through photolithography and etching, thereby completing the nonvolatile semiconductor memory device.

In the aforementioned embodiment, the floating gate material is employed as the material for the poly-diode element 102. Further, P$^+$ ion implantation for the peripheral PMOS transistor 110 is employed for forming a P$^+$ electrode of the poly-diode element 102. In addition, N$^+$ implantation for the peripheral NMOS transistor 111 is employed for reducing the resistance of an N$^+$ electrode part of the poly-diode element 102. Therefore, no extra step may be added for forming the poly-diode element 102.

This embodiment may be modified as follows: The floating gate material is employed as the material for the poly-diode element 102. P$^+$ ion implantation for the peripheral PMOS transistor 110 is employed for forming the P$^+$ electrode. N$^+$ ion implantation for forming the source/drain regions 127 of the memory cell is employed for reducing the resistance of the N$^+$ electrode part. Also in this case, no extra step is added for forming the poly-diode element 102, whereby no extra cost is required.

Further, the N$^+$ electrode of the poly-diode element 102 may be formed simultaneously with N$^+$ ion implantation for forming the source/drain regions 127 of the memory cell.

[Modification 1 of Embodiment 1]

Figure 27:
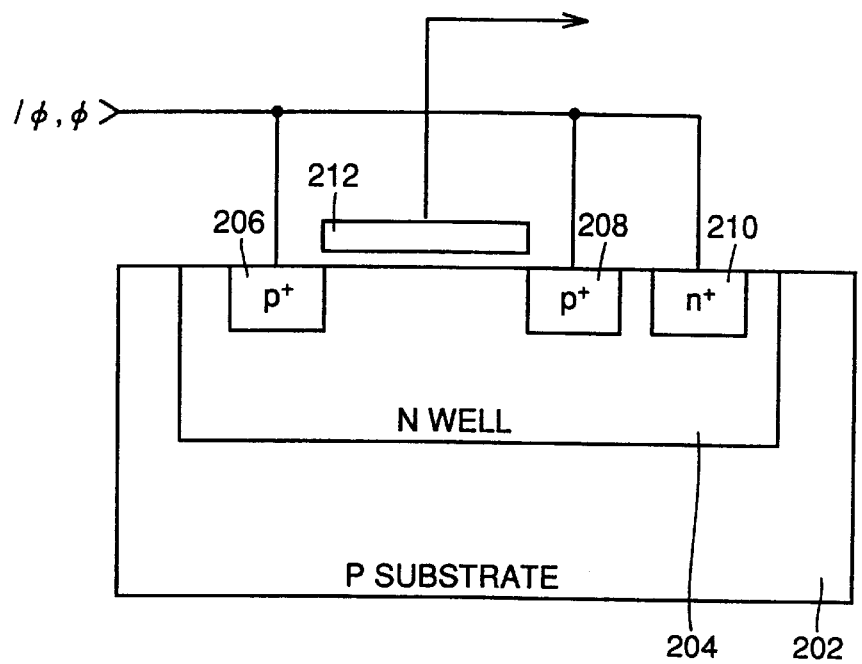
FIG. 27 is a schematic sectional view of a capacitive element employed as each of capacitors 62 to 68 in a modification 1 of the embodiment 1 of the present invention.

FIG. 27 is a schematic sectional view of a capacitive element employed as each of the capacitors 62 to 68 shown in FIG. 5 in a modification 1 of the embodiment 1 of the present invention.

Referring to FIG. 27, this capacitive element is a P-channel MOS transistor which is formed in an N well 204 provided on a P substrate 202.

P-type impurity regions 206 and 208 and an N-type impurity region 210 are formed on the N well 204. A gate electrode 212 is provided on a region held between the P-type impurity regions 206 and 208.

The P-type impurity regions 206 and 208 are supplied with a clock signal φ or /φ, and the gate electrode 212 is connected to a connection node of a poly-diode element.

The capacitance value of the capacitive element shown in FIG. 27 is settled by the thickness (about 100 Å) of a gate oxide film when a gate-to-source voltage Vgs is positive. Also when the gate-to-source voltage Vgs is at a negative level of a larger absolute value than a threshold value, an inversion layer is. formed and the capacitance value is settled by the thickness of the gate oxide film. While FIG. 27 shows a section of the P-channel MOS transistor, the capacitive element may not be a MOS transistor so far as the same has a MOS-source structure.

Due to employment of such a capacitive element, a large capacitance value can be attained whether the voltage applied between electrodes is positive or negative.

[Modification 2 of Embodiment 1]

Figure 28:
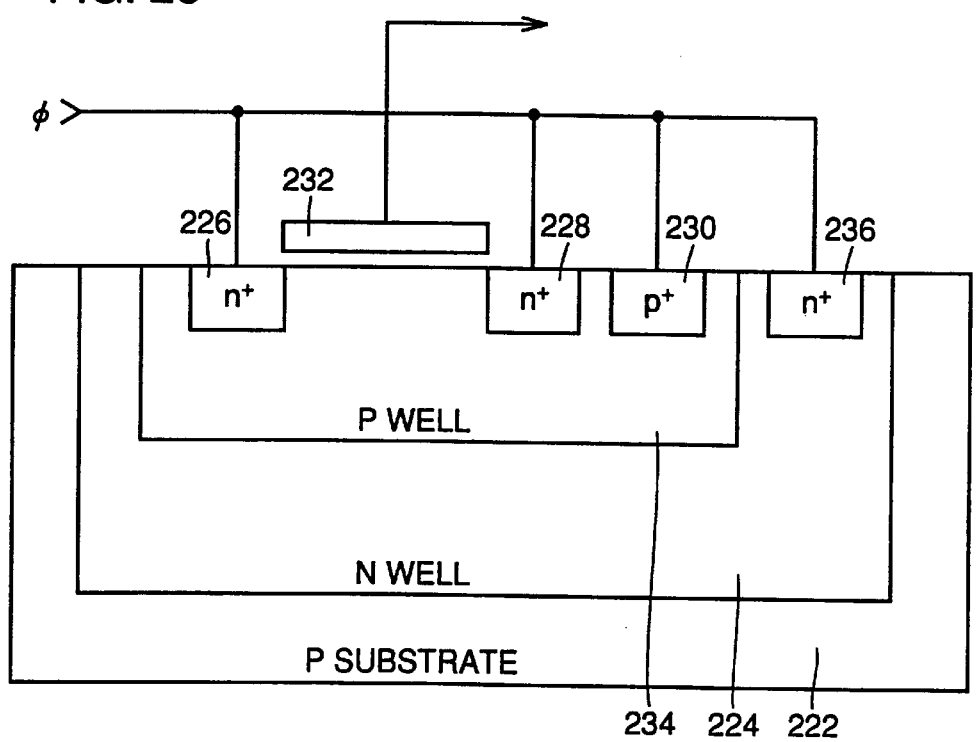
FIG. 28 is a schematic sectional view of a capacitive element employed as each of the capacitors 62 to 68 in a modification 2 of the embodiment 1 of the present invention.

FIG. 28 is a schematic sectional view showing a capacitive element employed as each of the capacitors 62 to 68 shown in FIG. 5 in a modification 2 of the embodiment 1 of the present invention.

Referring to FIG. 28, the capacitive element employed in the modification 2 of the embodiment 1 is an N-channel MOS transistor which is provided on a P well 234 further provided in an N well 224 provided on a P substrate 222.

N-type impurity regions 226 and 228 and a P-type impurity region 230 are provided on the P well 234. A gate electrode 232 is formed on a region held between the N-type impurity regions 226 and 228.

The N-type impurity regions 226 and 228, still another N-type impurity region 236 and the P-type impurity region 230 are supplied with a clock signal φ or /φ, and the gate electrode 232 is connected to a connection node of a poly-diode element.

When a gate-to-source voltage Vgs is positive, an inversion layer is formed and the capacitance value of the capacitive element shown in FIG. 28 is settled by the thickness (about 100 Å) of a gate oxide film. Also when the gate-to-source voltage Vgs is at a negative level of a larger absolute value than a threshold value, the capacitance value is settled by the thickness of the gate oxide film. While FIG. 28 shows a section of the N-channel MOS transistor, the capacitive element may not be a MOS transistor so far as the same has a MOS-source structure.

Due to employment of such a capacitive element, a large capacitance value can be attained whether the voltage applied between electrodes is positive or negative.

[Modification 3 of Embodiment 1]

Figure 29:
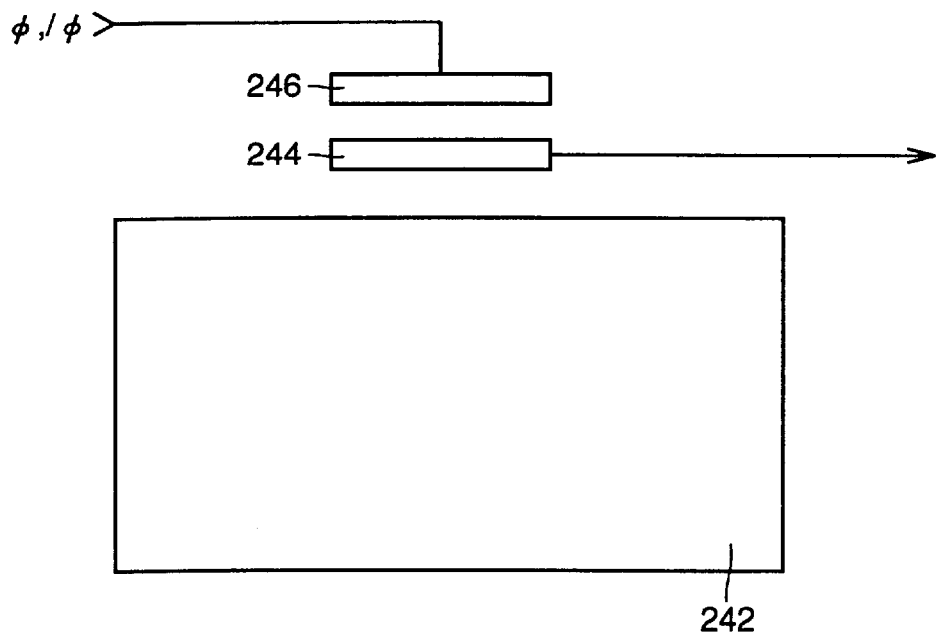
FIG. 29 is a schematic sectional view of a capacitive element employed as each of the capacitors 62 to 68 in a modification 3 of the embodiment 1 of the present invention.

FIG. 29 is a schematic sectional view showing a capacitive element employed as each of the capacitors 62 to 68 shown in FIG. 5 in a modification 3 of the embodiment 1 of the present invention.

Referring to FIG. 29, the capacitive element in the modification 3 of the embodiment 1 is a capacitor which is provided on a P substrate 242.

A first electrode of this capacitor is a polysilicon upper layer electrode 246, made of a control gate material, which is supplied with a clock signal φ or /φ, and a second electrode is a polysilicon lower layer electrode 244, made of a floating gate material, which is connected to a connection node of a poly-diode element.

In a flash memory, the polysilicon lower electrode 244 is employed as the floating gate of a memory element, while the polysilicon upper layer electrode 246 is employed as the control gate of the memory element. An interlayer isolation film provided between these electrodes 244 and 246 has an extremely small thickness (about 150 Å), whereby such a capacitor can be particularly readily provided in the flash memory.

[Modification 4 of Embodiment 1]

Figure 30:
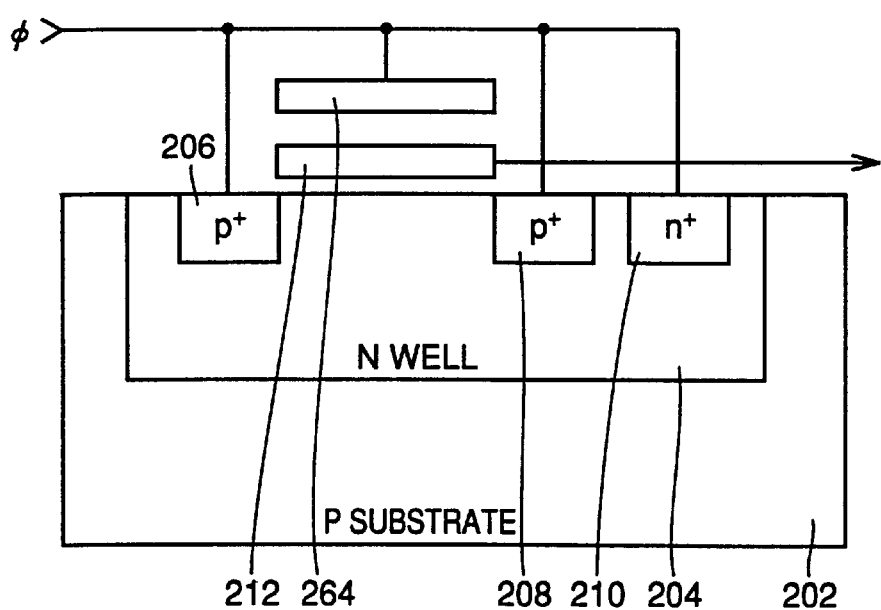
FIG. 30 is a schematic sectional view of a capacitive element employed as each of the capacitors 62 to 68 in a modification 4 of the embodiment 1 of the present invention.

FIG. 30 is a schematic sectional view showing a capacitive element employed as each of the capacitors 62 to 68 shown in FIG. 5 in a modification 4 of the embodiment 1 of the present invention.

Referring to FIG. 30, the capacitive element employed in the modification 4 of the embodiment 1 is different from that shown in FIG. 27 in a point that a polysilicon upper layer electrode 264 is further provided on a gate electrode 212. The upper layer electrode 264 is supplied with a clock signal φ or /φ. The remaining parts are identical to those of the capacitive element shown in FIG. 27, and hence description thereof is not repeated.

The capacitive element according to the modification 4 of the embodiment 1 has a capacitance value which is equal to that obtained by connecting the capacitive elements according to the modifications 1 and 3 of the embodiment 1 in parallel with each other. Therefore, the capacitance value per unit area can be so increased that the area of the charge pump circuit can be suppressed small.

[Modification 5 of Embodiment 1]

Figure 31:
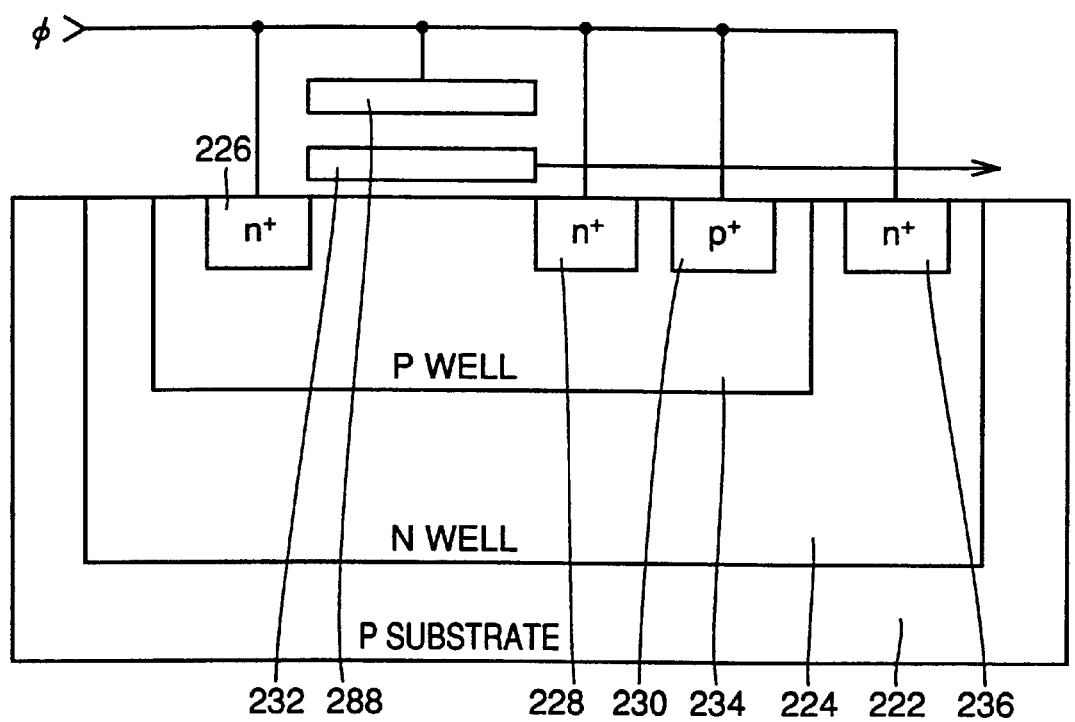
FIG. 31 is a schematic sectional view of a capacitive element employed as each of the capacitors 62 to 68 in a modification 5 of the embodiment 1 of the present invention.

FIG. 31 is a schematic sectional view showing a capacitive element employed as each of the capacitors 62 to 68 shown in FIG. 5 in a modification 5 of the embodiment 1 of the present invention.

Referring to FIG. 31, the capacitive element employed in the modification 5 of the embodiment 1 is different from that according to the modification 2 of the embodiment 1 in a point that a polysilicon upper layer electrode 288 is further provided above a gate electrode 232.

The polysilicon upper layer electrode 288 is supplied with a dock signal φ or /φ.

The remaining parts are identical to those of the capacitive element shown in FIG. 28, and hence description thereof is not repeated.

The capacitive element according to the modification 5 of the embodiment 1 has a capacitance value which is equal to that obtained by connecting the capacitive elements according to the modifications 2 and 3 of the embodiment 1 in parallel with each other. Therefore, the capacitance value per unit area can be so increased that the area of the charge pump circuit can be suppressed small.

[Modification 6 of Embodiment 1]

Figure 32:
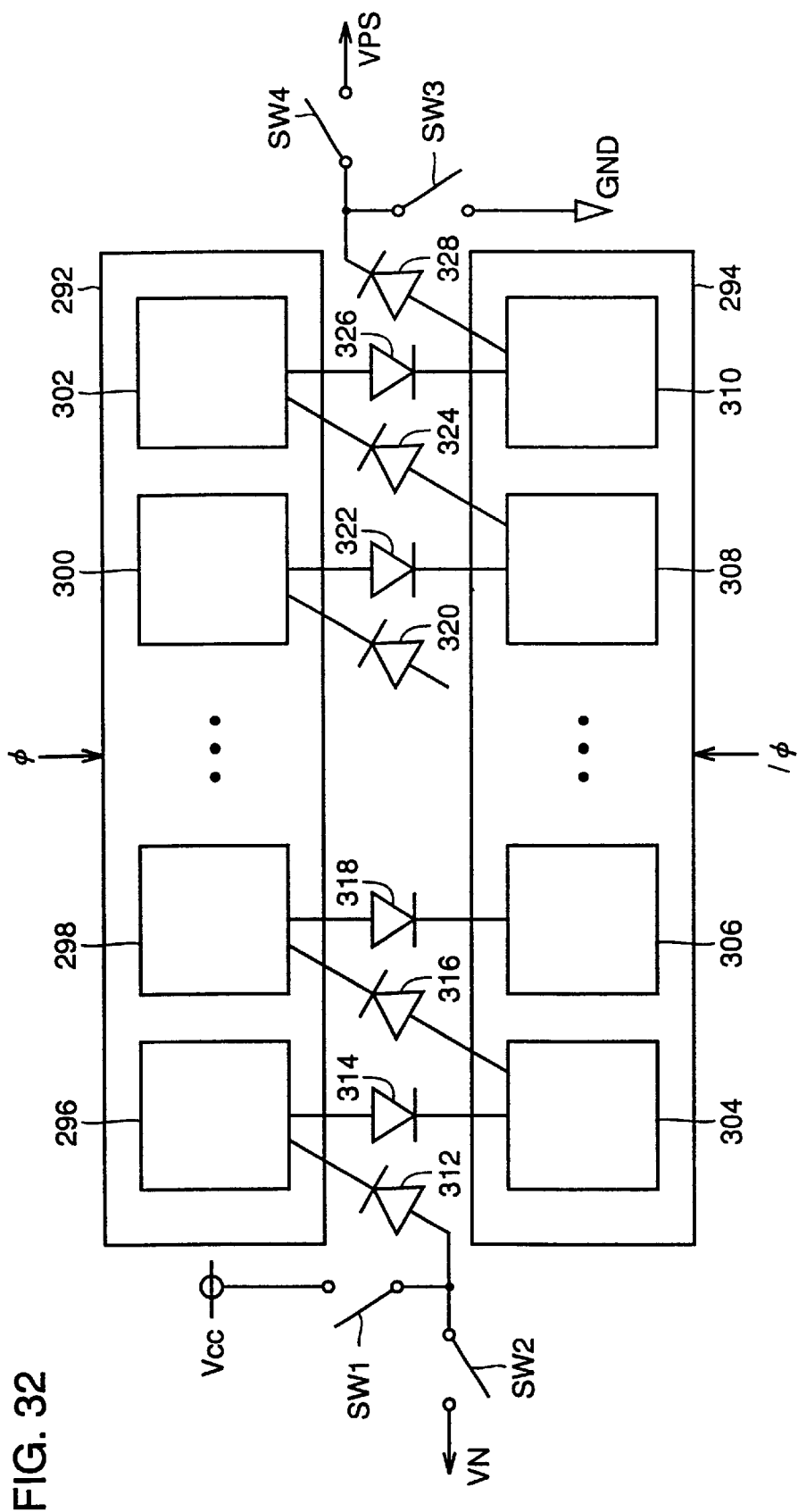
FIG. 32 schematically illustrates the arrangement of a charge pump circuit part in a modification 6 of the embodiment 1 of the present invention.

FIG. 32 schematically illustrates the arrangement of a charge pump circuit part according to a modification 6 of the embodiment 1 of the present invention.

Referring to FIG. 32, capacitive elements 296 to 310 correspond to the capacitors 62 to 68 shown in FIG. 5. Diode elements 312 to 328 correspond to the diodes 54 to 60 shown in FIG. 5. The capacitive elements 296 to 302 which are supplied with a clock signal φ in first electrodes thereof are provided in a single well 292. On the other hand, the capacitive elements 304 to 310 which are supplied with a clock signal /φ in first electrodes thereof are provided in another well 294. Switches SW1 and SW2 and the capacitive element 296 are connected to an anode and a cathode of the diode element 312 respectively.

The capacitive elements 296 and 304 are connected to an anode and a cathode of the diode element 314 respectively. The capacitive elements 304 and 298 are connected to an anode and a cathode of the diode element 316 respectively. The capacitive elements 298 and 306 are connected to an anode and a cathode of the diode element 318 respectively. The capacitive element 300 is connected to a cathode of the diode element 320.

The capacitive elements 300 and 308 are connected to an anode and a cathode of the diode element 322 respectively. The capacitive elements 308 and 302 are connected to an anode and a cathode of the diode element 324 respectively. The capacitive elements 302 and 310 are connected to an anode and a cathode of the diode element 326 respectively. The capacitive element 310 and switches SW3 and SW4 are connected to an anode and a cathode of the diode element 328 respectively.

Due to the aforementioned arrangement, area increase resulting from well isolation can be suppressed in case of employing MOS transistors as the capacitors (not restricted to transistors so far as the capacitors have a MOS-source structure) as in the modifications 1, 2, 4 and 5 of the embodiment 1 by forming capacitors employing clock signals of the same phases in common wells.

[Modification 7 of Embodiment 1]

Figure 33:
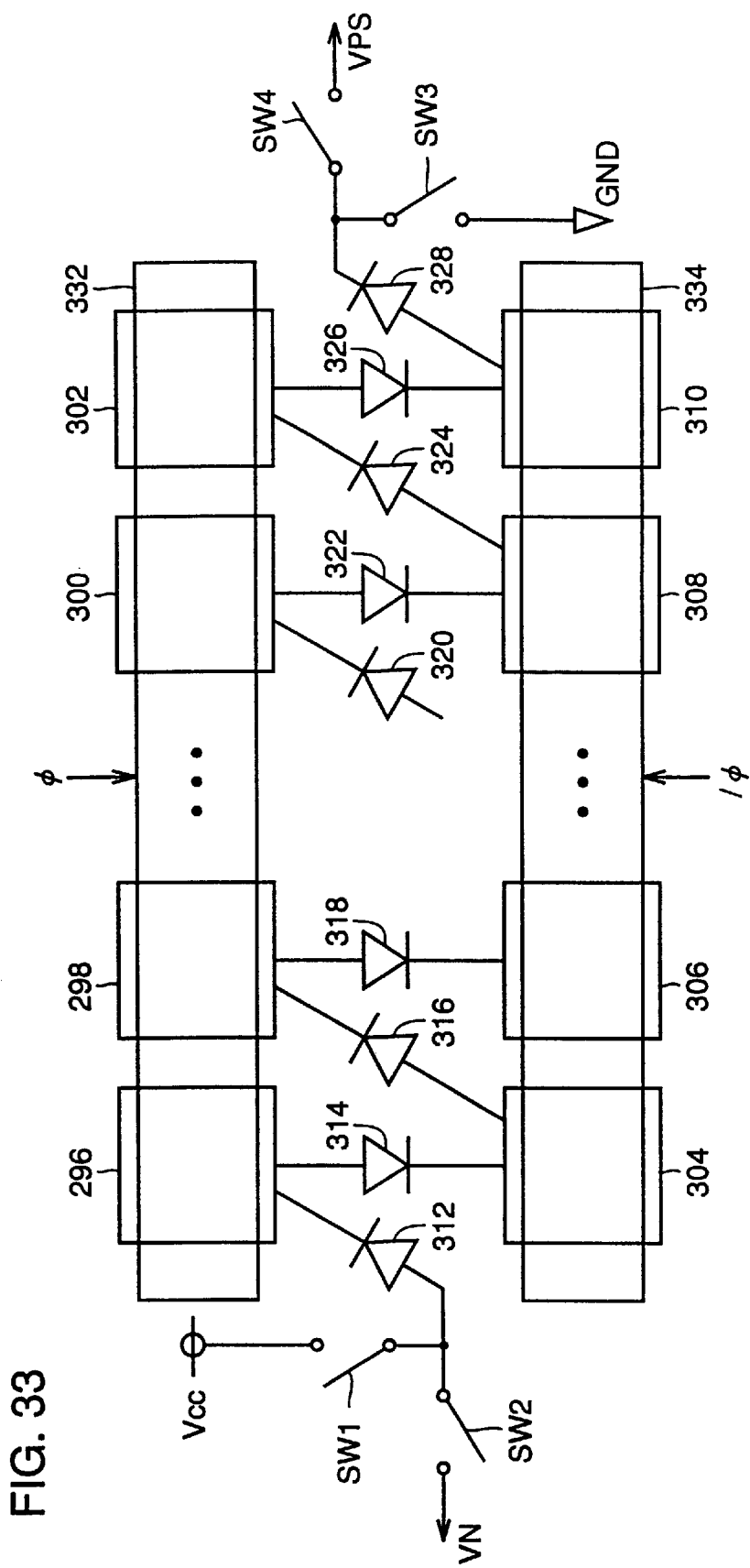
FIG. 33 schematically illustrates the arrangement of a charge pump circuit part in a modification 7 of the embodiment 1 of the present invention.

FIG. 33 schematically illustrates the arrangement of a charge pump circuit part according to a modification 7 of the embodiment 1 of the present invention.

Referring to FIG. 33, the charge pump circuit part according to the modification 7 of the embodiment 1 is different from that according to the modification 6 of the embodiment 1 in a point that a plurality of capacitive elements share polysilicon upper layer electrodes 332 and 334 which are supplied with clock signals φ and /φ respectively in place of common wells. The remaining structure of this modification is similar to that of the modification 6, and hence description thereof is not repeated.

Due to the arrangement of the charge pump circuit part according to the modification 7 of the embodiment 1, a layout saving connection by aluminum interconnections can be implemented by connecting polysilicon upper layer electrodes of capacitive elements and sharing the same in case of supplying clock signals to the polysilicon upper layer electrodes as in the modifications 3, 4 and 5 of the embodiment 1. Thus, availability of aluminum interconnections used for a purpose other than connection of the charge pump circuit can be increased.

[Modification 8 of Embodiment 1]

Figure 34:
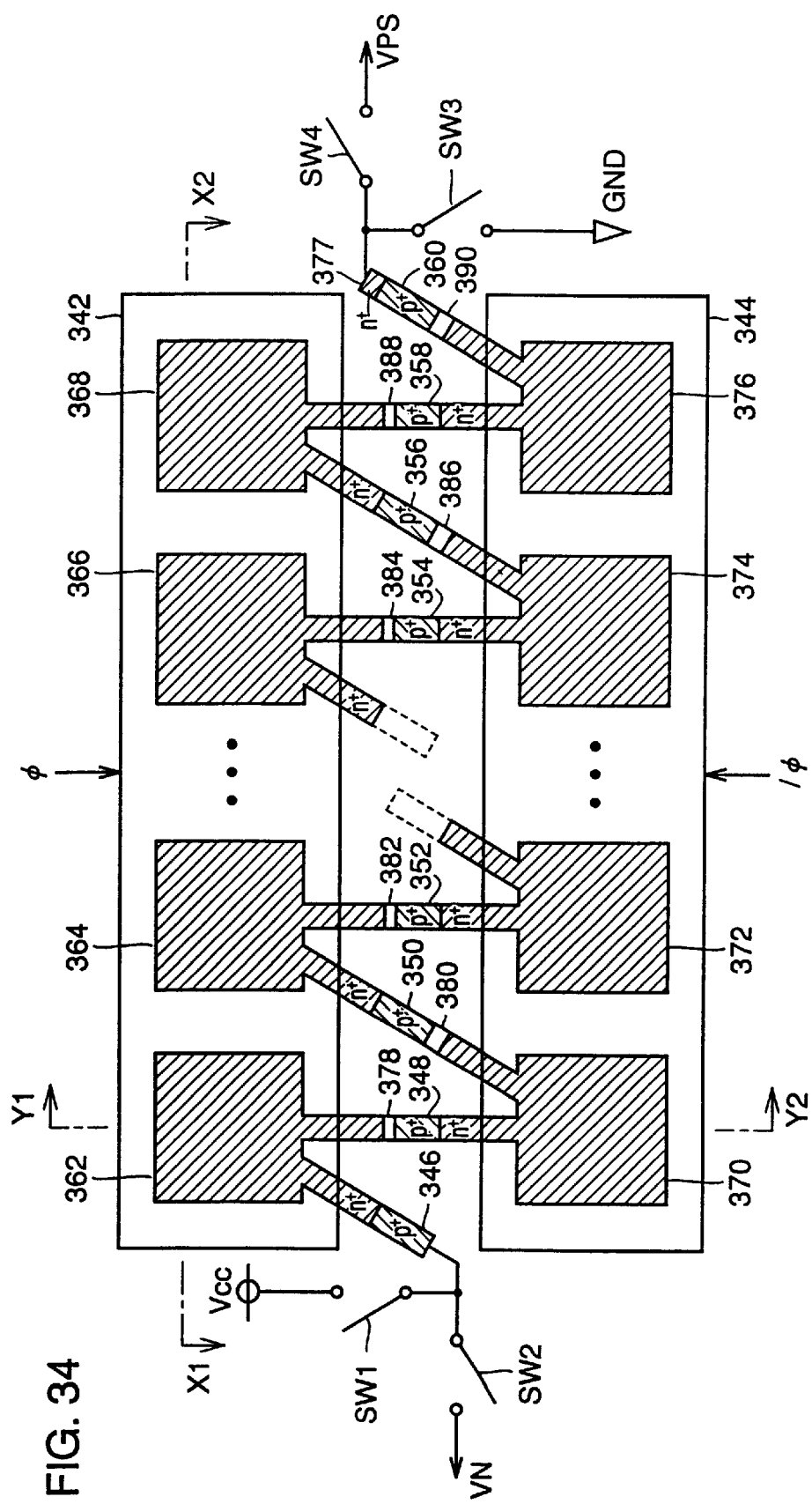
FIG. 34 schematically illustrates the arrangement of a charge pump circuit part in a modification 8 of the embodiment 1 of the present invention.

FIG. 34 schematically illustrates the arrangement of a charge pump circuit part according to a modification 8 of the embodiment 1 of the present invention.

The modification 8 of the embodiment 1 is characterized in arrangement of polysilicon lower layer electrodes in relation to the modification 6 of the embodiment 1. Referring to FIG. 34, the charge pump circuit part according to the modification 8 of the embodiment 1 includes P-type regions 346 to 360 made of a floating gate material, N-type regions 362 to 368 and 370 to 377 made of a floating gate material, and aluminum interconnections 378 to 390.

The P-type region 346 is connected to switches SW1 and SW2 which are similar to those shown in FIG. 5. The P-type regions 346, 348, 350, 352, 354, 356, 358 and 360 are in contact with the N-type regions 362, 370, 364, 372, 374, 368, 376 and 377 respectively, and define PN junction diodes in the contact parts therebetween.

The aluminum interconnections 378, 380 and 382 connect the N-type regions 362, 370 and 364 to the P-type regions 348, 350 and 352 respectively.

The aluminum interconnections 384, 386, 388 and 390 connect the N-type regions 366, 374, 368 and 376 to the P-type regions 354, 356, 358 and 360 respectively.

Figure 35:
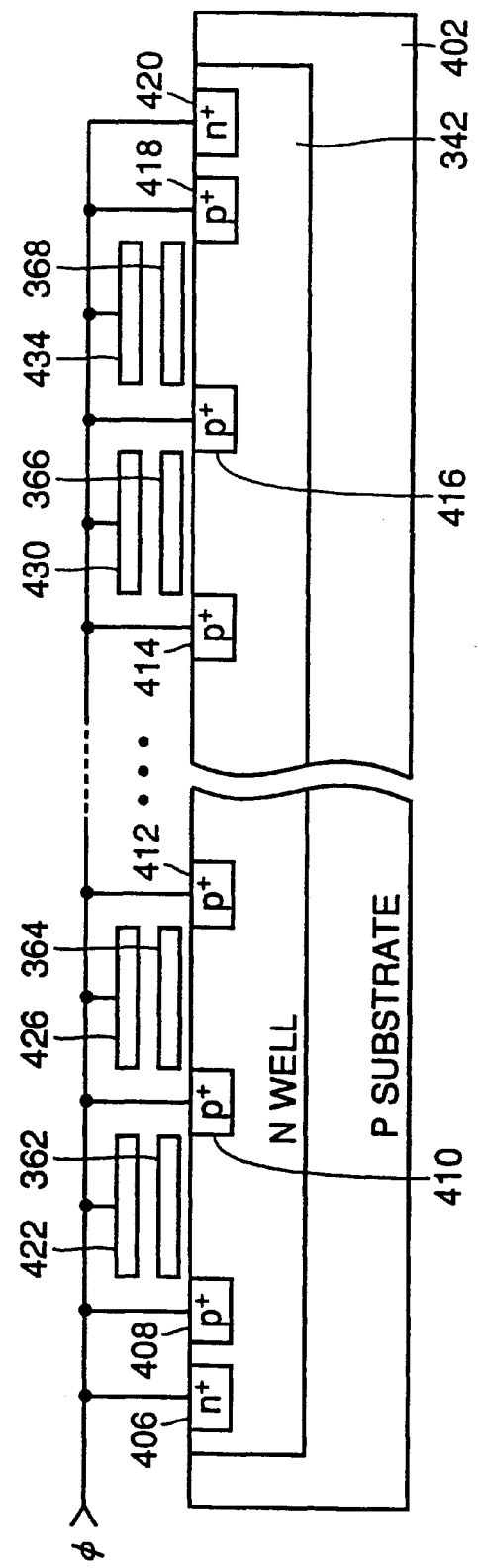
FIG. 35 is a schematic sectional view taken along the line Xl–X2 in FIG. 34.

FIG. 35 is a schematic sectional view taken along the line X1–X2 in FIG. 34.

Referring to FIG. 35, an N well 342 is provided in a P substrate 402, and N-type impurity regions 406 and 420 and P-type impurity regions 408 to 418 are provided in the N well 342. A polysilicon lower layer electrode 362 and a polysilicon upper layer electrode 422 are provided in a region held between the P-type impurity regions 408 and 410. A polysilicon lower layer electrode 364 and a polysilicon upper layer electrode 426 are provided on a region held between the P-type impurity regions 410 and 412. A polysilicon lower layer electrode 366 and a polysilicon upper layer electrode 430 are provided on a region held between the P-type impurity regions 414 and 416. A polysilicon lower layer electrode 368 and a polysilicon upper layer electrode 434 are provided on a region held between the P-type impurity regions 416 and 418.

The N well 342 is supplied with a clock signal φ through the N-type impurity regions 406 and 420. The P-type impurity regions 408 to 418 and the polysilicon upper layer electrodes 422 to 434 are also supplied with the clock signal φ.

Figure 36:
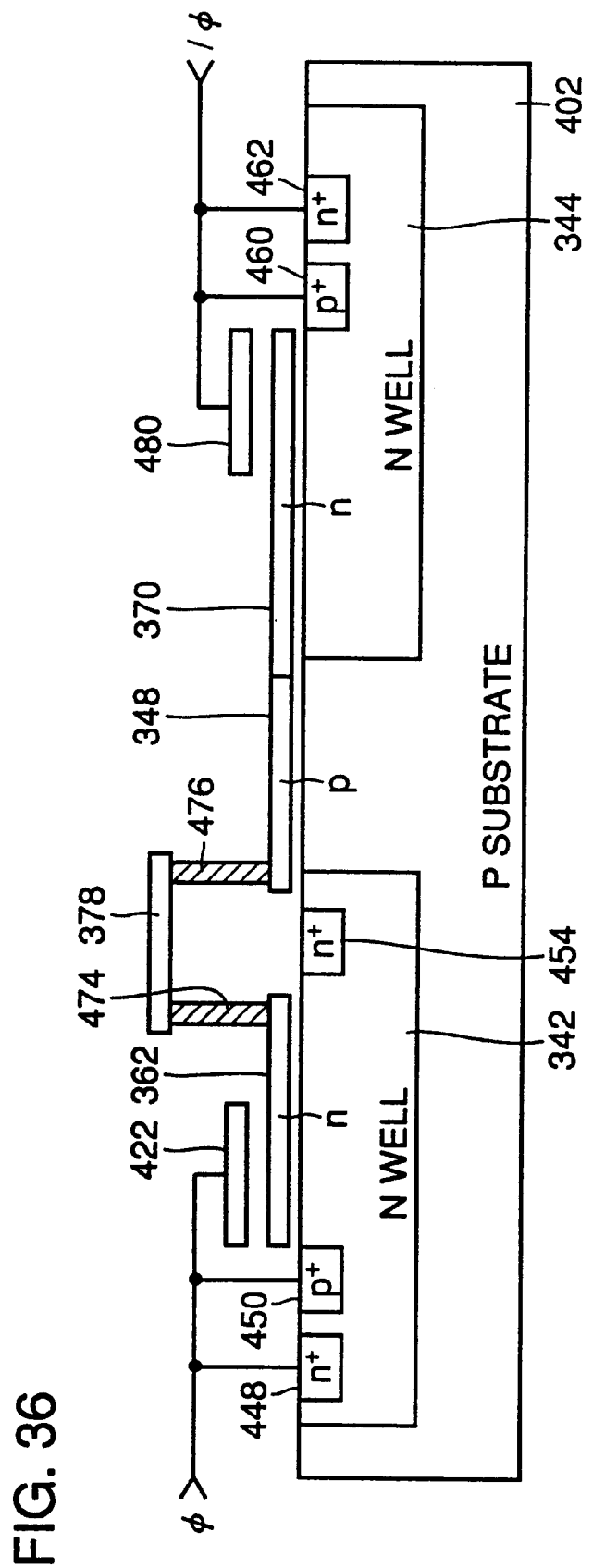
FIG. 36 is a schematic sectional view taken along the line Y1–Y2 in FIG. 34.

FIG. 36 is a schematic sectional view taken along the line Y1–Y2 in FIG. 34.

Referring to FIG. 36, the N well 342 and another N well 344 are formed on the P substrate 402. N-type impurity regions 448 and 454 and a P-type impurity region 450 are formed in the N well 342. A P-type impurity region 460 and an N-type impurity region 462 are formed in the N well 344. N-type polysilicon lower layer electrodes 362 and 370 made of the floating gate material and a P-type polysilicon lower layer electrode 348 are formed on the N wells 342 and 344 and the P substrate 402 respectively. A polysilicon upper layer electrode 422 is formed on the polysilicon lower layer electrode 362, to define a capacitor on the overlapping portion therebetween. A polysilicon upper layer electrode 480 is formed on the polysilicon lower layer electrode 370, to define a capacitor on the overlapping portion therebetween.

The N-type impurity region 448, the P-type impurity region 450 and the polysilicon upper layer electrode 422 are supplied with the clock signal φ. The N-type impurity region 460, the P-type impurity region 462 and the polysilicon upper layer electrode 480 are supplied with a clock signal /φ.

The polysilicon lower layer electrode 362 is connected with the aluminum interconnection 378 through a contact part 474. The polysilicon lower layer electrode 348 is connected with the aluminum interconnection 378 through a contact part 476.

The P-type polysilicon lower layer electrode 348 is in contact with the N-type polysilicon lower layer electrode 370, to define a PN junction diode.

In the modification 8 of the embodiment 1, the floating gate material in the region forming the charge pump circuit part is also employed as a interconnection connecting a diode element and a capacitor with each other, whereby substantially no aluminum interconnection may be employed as compared with the modification 6 of the embodiment 1, and the availability of the aluminum interconnection can be increased.

[Modification 9 of Embodiment 1]

Figure 37:
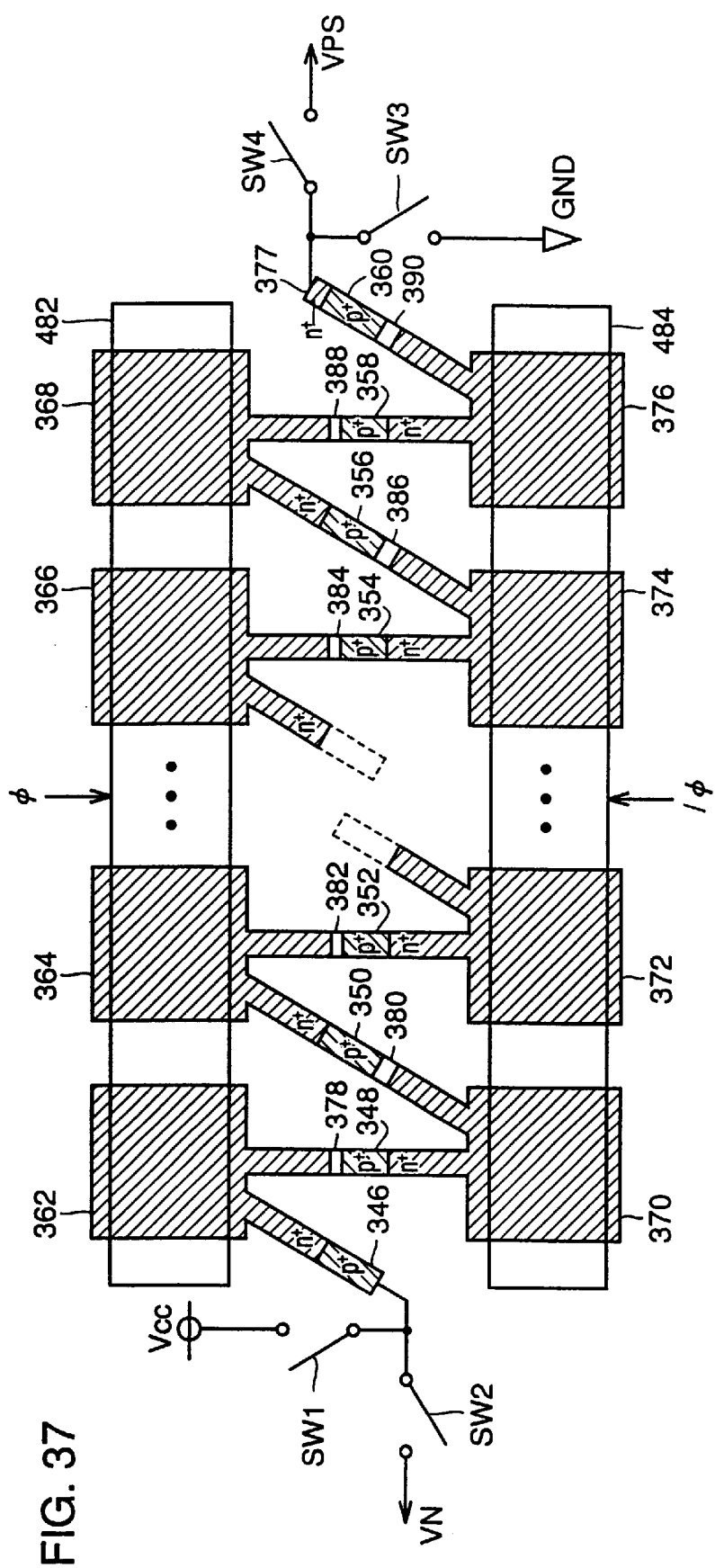
FIG. 37 schematically illustrates the arrangement of a charge pump circuit part in a modification 9 of the embodiment 1 of the present invention.

FIG. 37 schematically illustrates the arrangement of a charge pump circuit part according to a modification 9 of the embodiment 1 of the present invention.

Referring to FIG. 37, the arrangement of the charge pump circuit part according to the modification 9 of the embodiment 1 is different from that according to the modification 8 in a point that capacitors share not wells 342 and 344 supplied with clock signals φ and /φ respectively but polysilicon upper layer electrodes 482 and 484 supplied with the clock signals φ and /φ respectively. The arrangement of the remaining parts is similar to that shown in FIG. 34, and hence description thereof is not repeated.

In the modification 9 of the embodiment 1, the floating gate material in the region forming the charge pump circuit is also employed as a interconnection connecting a diode element and a capacitor with each other, whereby substantially no aluminum interconnection may be employed as compared with the modification 7 of the embodiment 1, and the availability of the aluminum interconnection can be increased.

[Embodiment 2]

Figure 38:
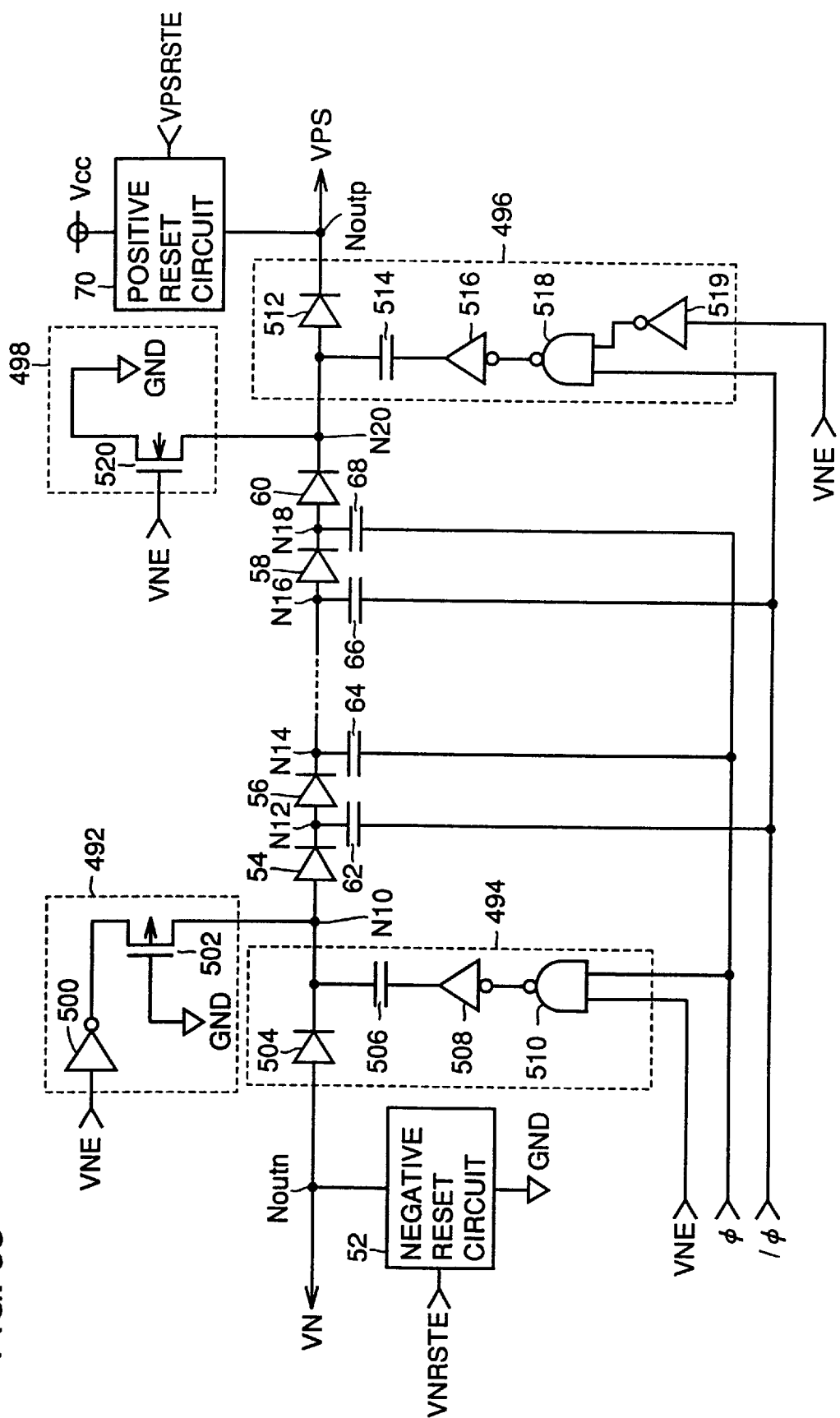
FIG. 38 is a circuit diagram showing the structure of a charge pump circuit according to an embodiment 2 of the present invention.

FIG. 38 is a circuit diagram showing the structure of a charge pump circuit according to an embodiment 2 of the present invention.

Referring to FIG. 38, the charge pump circuit according to the embodiment 2 includes switches 492, 494, 498 and 496 in place of the switches SW1 to SW4 shown in FIG. 5.

The switch 492 includes an invertor 500 receiving and inverting a control signal VNE, and a P-channel MOS transistor 502 having a gate connected to a ground potential GND and connecting an output of the inventor 500 to a node N10.

The switch 494 includes a diode 504 feeding a current from an output node Noutn toward the node N 10, a NAND circuit 510 receiving the control signal VNE and a clock signal φ, an invertor 508 receiving and inverting an output of the NAND circuit 510, and a capacitor 506 which is connected between an output node of the invertor 508 and the node N10.

The switch 496 includes a diode 512 feeding a current from a node N20 toward an output node Noutp, an invertor 519 receiving and inverting the control signal VNE, a NAND circuit 518 receiving an output of the invertor 519 and a clock signal /φ, and a capacitor 514 which is connected between an output node of the invertor 516 and the node N20.

The switch 498 includes an N-channel MOS transistor 520 receiving the control signal VNE in its gate and connecting the node N20 to the ground potential GND.

The remaining structure of this charge pump circuit is similar to that shown in FIG. 5 in relation to the embodiment 1, and hence description thereof is not repeated.

FIG. 39 illustrates the relation between operating states of the charge pump circuit shown in FIG. 38 and respective control input signals.

Referring to FIGS. 38 and 39, the control signal VNE and control signals VPSRSTE and VNRSTE are set at a low level, a low level (inactive) and a high level (active) respectively when the charge pump circuit uses a positive potential VPS.

The potential of an output node of the invertor 500 reaches a power supply potential Vcc which is an inverted level of the control signal VNE. The P-channel MOS transistor 502 receiving the ground potential GND in its gate is in a conducting state, and the potential of the node N10 reaches the power supply potential Vcc.

A negative reset circuit 52 which is activated by the control signal VNRSTE fixes the potential of the output node Noutn at the ground potential GND. The control signal VNE inactivates the NAND circuit 510, whereby no clock signal φ is transmitted to the invertor 508 and the capacitor 506. The potential of the node N10 is stabilized at the power supply potential Vcc.

On the other hand, the control signal VNE brings the N-channel MOS transistor 520 into a non-conducting state, whereby the node N20 is isolated from the ground potential GND. Further, the invertor 519 receiving the control signal VNE activates the NAND circuit 518, so that the clock signal /φ is transmitted to the invertor 516 and the capacitor 514.

The control signal VPSRSTE inactivates a positive reset circuit 70, whereby the output node Noutp is isolated from the power supply potential Vcc.

Diodes 54 to 60 and the diode 512 and capacitors 62 to 68 and the capacitor 514 supplied with the clock signals φ and /φ bring the potential of the output node Noutp to a prescribed high potential VPS.

When the charge pump circuit uses a negative potential VN, on the other hand, the control signals VNE, VPSRSTE and VNRSTE are set at a high level, a high level (active) and a low level (inactive) respectively.

The control signal VNE brings the N-channel MOS transistor 520 into a conducting state, whereby the potential of the node N20 reaches the ground potential GND.

The output of the invertor 519 inverting the control signal VNE inactivates the NAND circuit 518, whereby no clock signal /φ is transmitted to the invertor 516 and the capacitor 514. The potential of the node N20 is stabilized at the ground potential GND.

The positive reset circuit 70 activated by the control signal VPSRSTE fixes the potential of the output node Noutp at the power supply potential Vcc.

On the other hand, the potential of the output node of the invertor 500 reaches the ground potential GND, which is the inverted level of the control signal VNE. The P-channel MOS transistor 502 supplied with the ground potential GND in its gate enters a non-conducting state. Therefore, the node N10 is isolated from the ground potential GND.

The control signal VNRSTE inactivates the negative reset circuit 52, whereby the output node Noutn is isolated from the ground potential GND.

Further, the control signal VNE activates the NAND circuit 510, whereby the clock signal φ is transmitted to the invertor 508 and the capacitor 506.

Therefore, the diodes 504 and 54 to 60 and the capacitors 506 and 62 to 68 supplied with the clock signals φ and /φ bring the potential of the output node Noutn to the prescribed negative potential VN.

Modifications similar to the modifications 1 to 9 of the embodiment 1 are also applicable to the embodiment 2.

[Embodiment 3]

Figure 40:
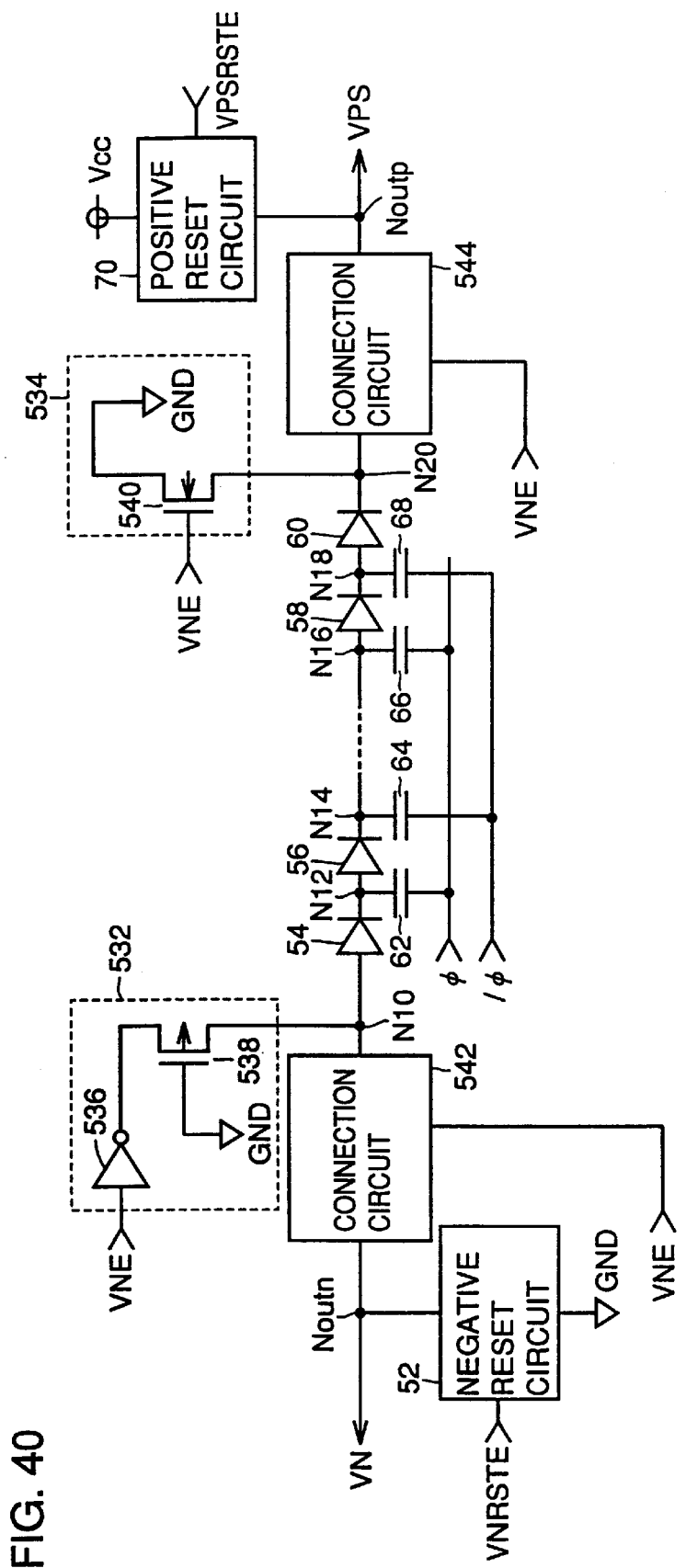
FIG. 40 is a circuit diagram showing the structure of a charge pump circuit according to an embodiment 3 of the present invention.

FIG. 40 is a circuit diagram showing the structure of a charge pump circuit according to an embodiment 3 of the present invention.

Referring to FIG. 40, the charge pump circuit according to the embodiment 3 includes a switch 532, a connection circuit 542, a switch 534 and a connection circuit 544 in place of the switches SW1 to SW4 shown in FIG. 5.

The switch 532 includes an invertor 536 receiving and inverting a control signal VNE, and a P-channel MOS transistor 538 having a gate connected to a ground potential GND and connecting an output of the invertor 536 to a node N10.

The switch 534 includes an N-channel MOS transistor 540 receiving the control signal VNE in its gate and connecting a node N20 to the ground potential GND.

The remaining structure of this embodiment is similar to that shown in FIG. 5 in relation to the embodiment 1, and hence description thereof is not repeated.

Figure 41:
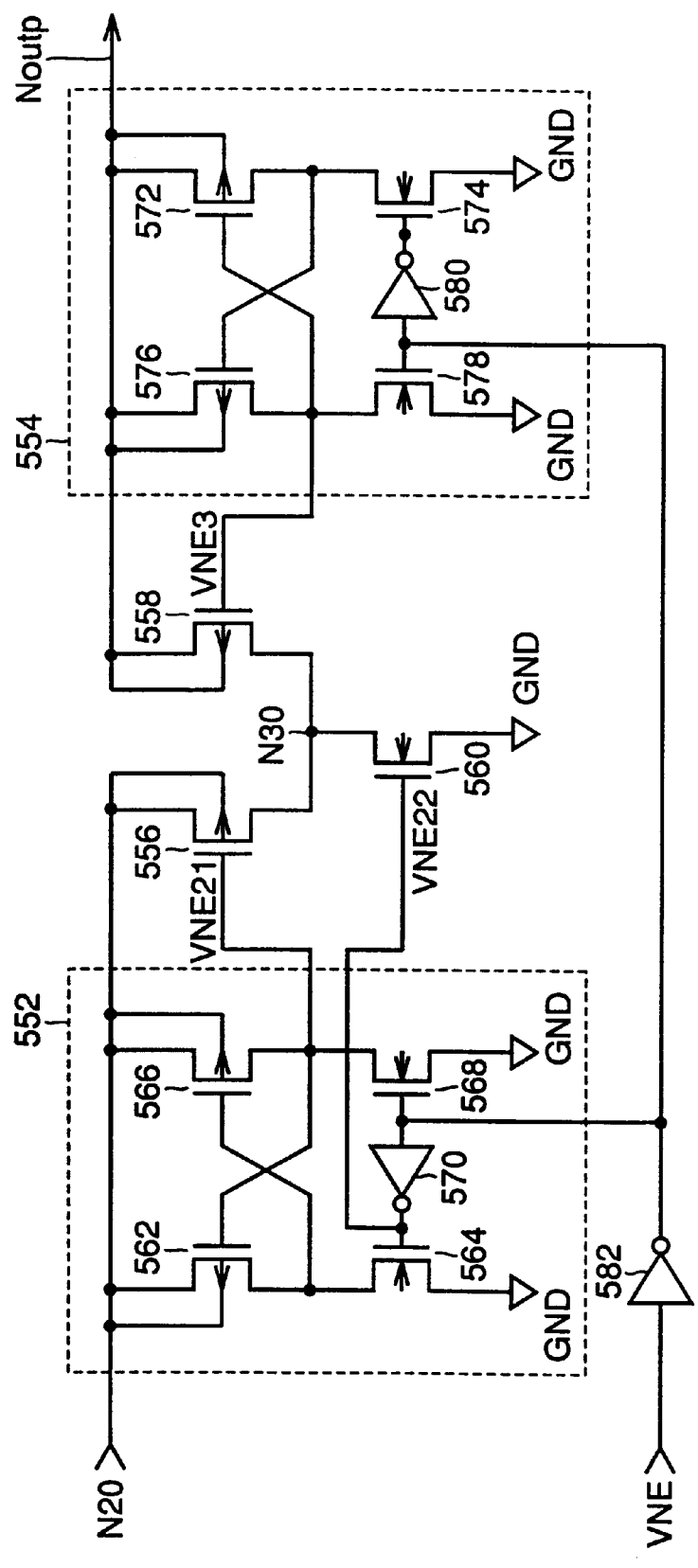
FIG. 41 is a circuit diagram showing the structure of a connection circuit 544 shown in FIG. 40.

FIG. 41 is a circuit diagram showing the structure of the connection circuit 544 appearing in FIG. 40.

Referring to FIG. 41, the connection circuit 544 includes an invertor 582 receiving and inverting the control signal VNE, a level shifter 552 receiving an output of the invertor 582 and outputting control signals VNE21 and VNE22, a level shifter 554 receiving the output of the invertor 582 and outputting a control signal VNE3, a P-channel MOS transistor 556 receiving the control signal VNE21 in its gate and connecting nodes N20 and N30 with each other, a P-channel MOS transistor 558 receiving the control signal VNE3 in its gate and connecting an output node Noutp with the node N30, and an N-channel MOS transistor 560 receiving the control signal VNE22 in its gate and supplying a ground potential GND to the node N30.

Back gates of the P-channel MOS transistors 556 and 558 are connected to the node N20 and the output node Noutp respectively.

The level shifter 552 includes an N-channel MOS transistor 568 receiving the output of the invertor 582 in its gate, an inventor 570 receiving and inverting the output of the invertor 582, and an N-channel MOS transistor 564 receiving an output of the invertor 570 in its gate. Each sources of the N-channel MOS transistors 568 and 564 is connected to the ground potential GND.

The level shifter 552 further includes a P-channel MOS transistor 566, having a gate connected with the drain of the N-channel MOS transistor 564, which is connected between the node N20 and the drain of the N-channel MOS transistor 568, and a P-channel MOS transistor 562, having a gate connected with the drain of the N-channel MOS transistor 568, which is connected between the node N20 and the drain of the N-channel MOS transistor 564. Each back gates of the P-channel MOS transistors 562 and 566 is connected to the node N20.

The level shifter 552 supplies the control signal VNE22 which is in phase with the control signal VNE to the gate of the N-channel transistor 560, and outputs the control signal VNE21, i.e., a signal which is in phase with the control signal VNE and has a high level corresponding to the potential of the node N20, to the gate of the N-channel MOS transistor 556 as the potential of the drain of the N-channel MOS transistor 568.

The level shifter 554 includes an N-channel MOS transistor 578 receiving the output of the invertor 582 in its gate, an invertor 580 receiving and inverting the output of the invertor 582, and an N-channel MOS transistor 574 receiving an output of the invertor 580 in its gate. Each sources of the N-channel MOS transistors 578 and 574 is connected to the ground potential GND.

The level shifter 554 further includes a P-channel MOS transistor 576, having a gate connected with the drain of the N-channel MOS transistor 574, which is connected between the output node Noutp and the drain of the N-channel MOS transistor 578, and a P-channel MOS transistor 572, having a gate connected with the drain of the N-channel MOS transistor 578, which is connected between the output node Noutp and the drain of the N-channel MOS transistor 574. Each back gates of the P-channel MOS transistors 572 and 576 is connected to the output node Noutp.

The level shifter 554 outputs the control signal VNE3, i.e., a signal which is in phase with the control signal VNE and has a high level corresponding to the potential of the output node Noutp, to the gate of the N-channel MOS transistor 558 as the potential of the drain of the Nchannel MOS transistor 578.

Due to this structure, gate-to-source voltages Vgs of the P-channel MOS transistors 556 and 558 become 0 V when the control signal VNE goes high regardless of the states of the potentials of the node N20 and the output node Noutp, whereby the P-channel MOS transistors 556 and 558 can be reliably brought into non-conducting states.

Figure 42:
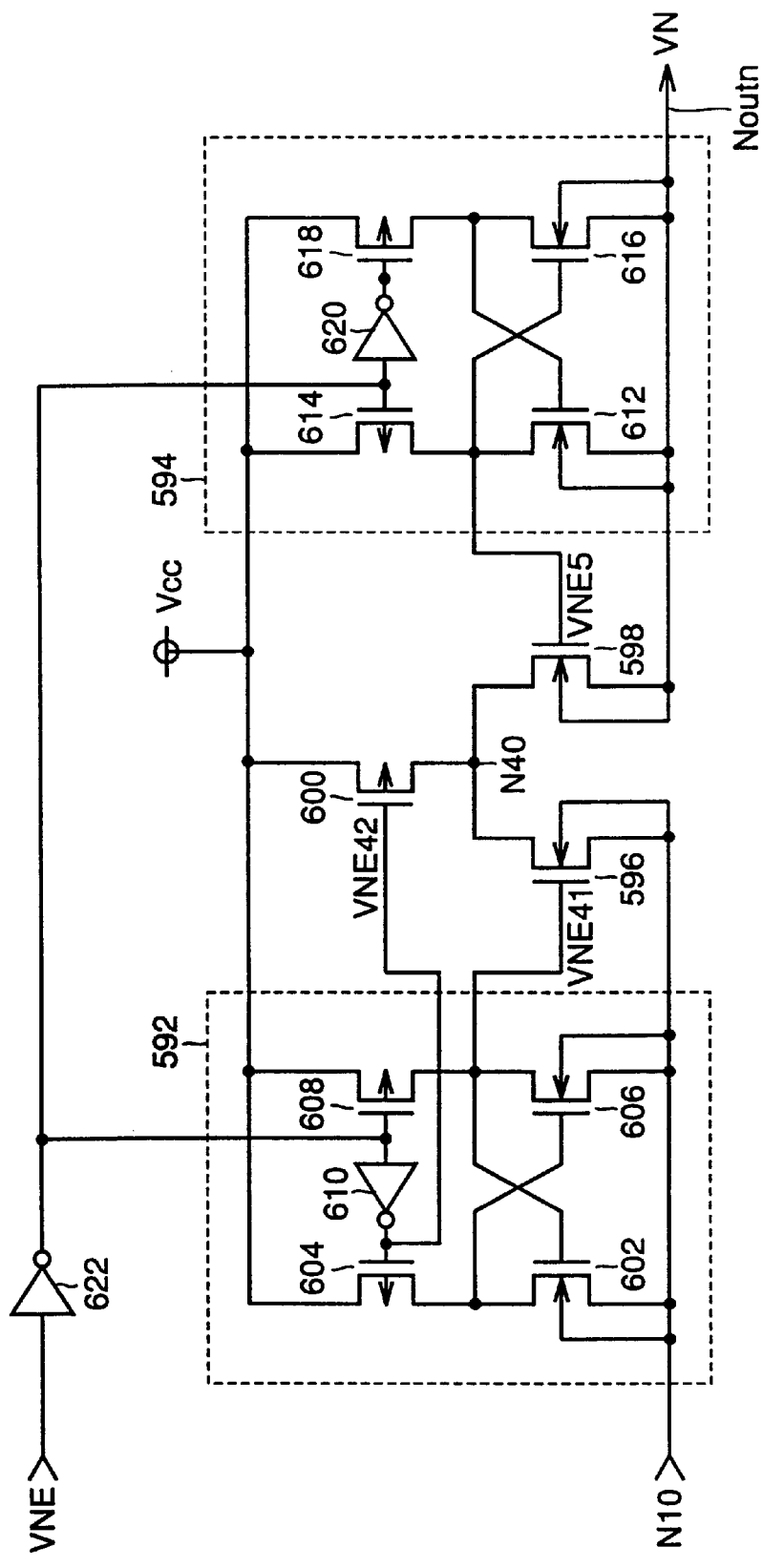
FIG. 42 is a circuit diagram showing the structure of a connection circuit 542 shown in FIG. 40.
Figure 44A:
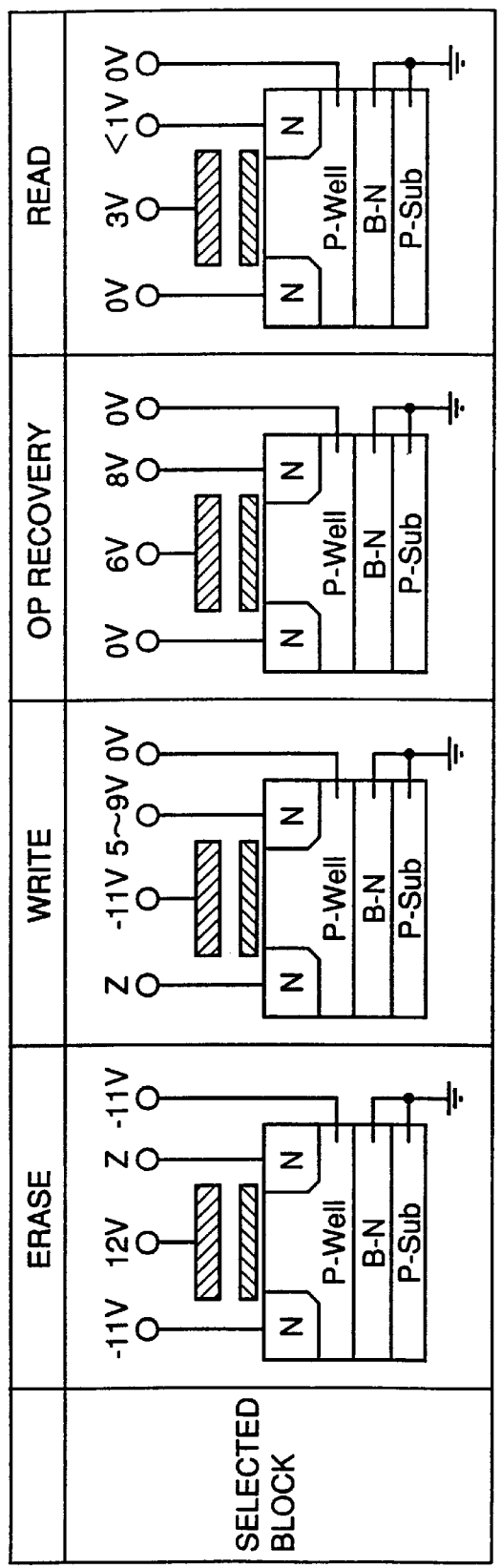
FIGS. 44A and 44B are diagrams to describe voltages supplied to each memory cell in respective modes of a conventional flash memory.
Figure 44B:
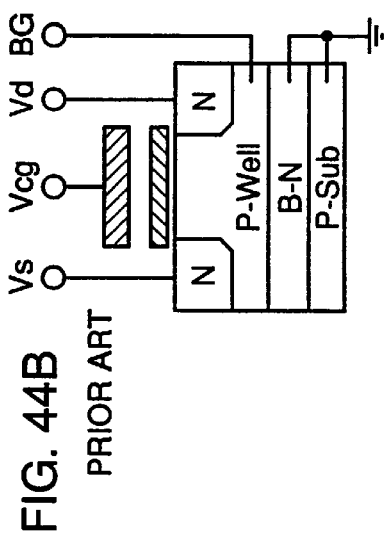
Figures 45, 46:
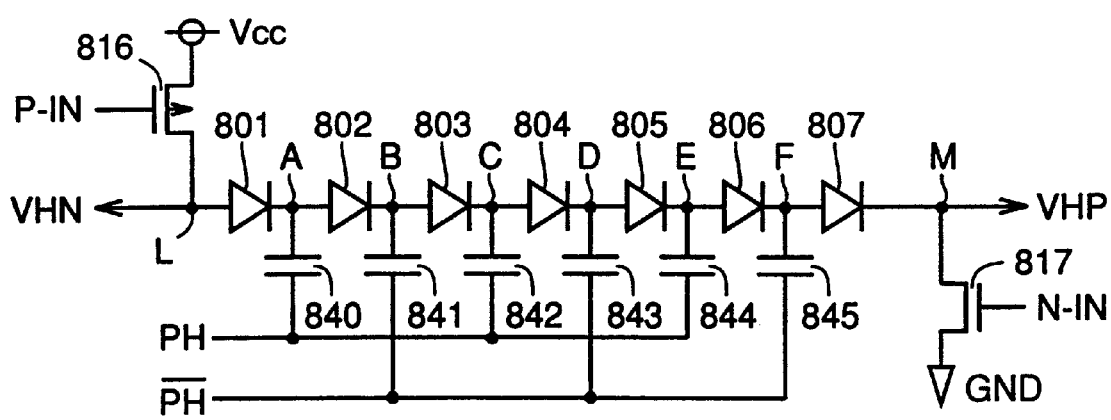
FIG. 45 is a diagram to describe voltages generated by charge pump circuits in respective modes of the conventional flash memory.
FIG. 46 is a circuit diagram showing the structure of a conventional charge pump circuit for generating positive and negative potentials.
Figure 47:
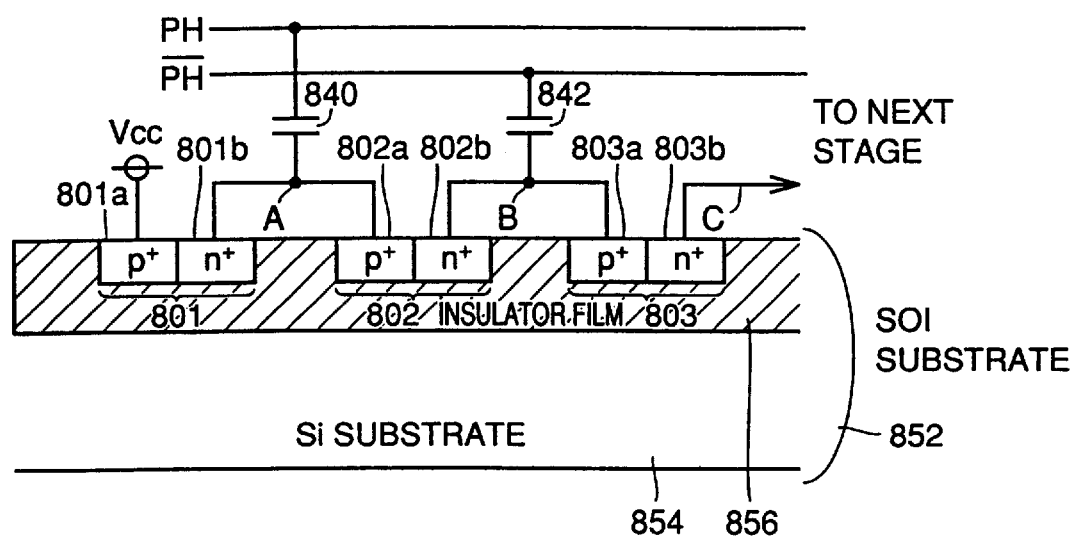
FIG. 47 is a sectional view for illustrating the structures of diode elements employed as some of diodes 801 to 807 shown in FIG. 46.

FIG. 42 is a circuit diagram showing the structure of the connection circuit 542 appearing in FIG. 40.

Referring to FIG. 42, the connection circuit 542 includes an invertor 622 receiving and inverting the control signal VNE, a level shifter 592 receiving an output of the invertor 622 and outputting control signals VNE41 and VNE42, a level shifter 594 receiving the output of the invertor 622 and outputting a control signal VNE5, an N-channel MOS transistor 596 receiving the control signal VNE41 in its gate and connecting the node N10 with a node N40, an N-channel MOS transistor 598 receiving the control signal VNE5 in its gate and connecting an output node Noutn and the node N40 with each other, and a P-channel MOS transistor 600 receiving the control signal VNE42 in its gate and supplying a power supply potential Vcc to a node N30.

Back gates of the N-channel MOS transistors 596 and 598 are connected to the node N10 and the output node Noutn respectively.

The level shifter 592 includes a P-channel MOS transistor 608 receiving the output of the invertor 622 in its gate, an invertor 610 receiving and inverting the output of the invertor 622, and a P-channel MOS transistor 604 receiving an output of the invertor 610 in its gate. Each sources of the P-channel MOS transistors 608 and 604 is connected to the power supply potential Vcc.

The level shifter 592 further includes an N-channel MOS transistor 606, having a gate connected with the drain of the P-channel MOS transistor 604, which is connected between the node N10 and the drain of the P-channel MOS transistor 608, and an N-channel MOS transistor 602, having a gate connected with the drain of the P-channel MOS transistor 608, which is connected between the node N1O and the drain of the P-channel MOS transistor 604. Each back gates of the N-channel MOS transistors 602 and 606 is connected to the node N10.

The level shifter 592 supplies the control signal VNE42 which is in phase with the control signal VNE to the gate of the P-channel MOS transistor 600, and outputs the control signal VNE41, i.e., a signal which is in phase with the control signal VNE and has a low level corresponding to the potential of the node N10, to the gate of the P-channel MOS transistor 596 as the potential of the drain of the P-channel MOS transistor 608.

The level shifter 594 includes a P-channel MOS transistor 614 receiving the output of the invertor 622 in its gate, an invertor 620 receiving and inverting the output of the invertor 622, and a P-channel MOS transistor 618 receiving an output of the invertor 620 in its gate. Each sources of the P-channel MOS transistors 614 and 618 is connected to the power supply potential Vcc.

The level shifter 594 further includes an N-channel MOS transistor 612, having a gate connected with the drain of the P-channel MOS transistor 618, which is connected between the node Noutn and the drain of the P-channel MOS transistor 614, and an N-channel MOS transistor 616, having a gate connected with the drain of the P-channel MOS transistor 614, which is connected between the node Noutn and the drain of the P-channel MOS transistor 618. Each back gates of the N-channel MOS transistors 612 and 616 is connected to the output node Noutn.

The level shifter 594 outputs the control signal VNE5, i.e., a signal which is in phase with the control signal VNE and has a low level corresponding to the potential of the output node Noutn, to the gate of the P-channel MOS transistor 598 as the potential of the drain of the P-channel MOS transistor 614.

Due to this structure, gate-to-source voltages Vgs of the N-channel MOS transistors 596 and 598 become 0 V when the control signal VNE goes low regardless of the states of the potentials of the node N10 and the output node Noutn, whereby the N-channel MOS transistors 596 and 598 can be reliably brought into non-conducting states.

FIG. 43 illustrates the relation between operating states of the charge pump circuit shown in FIG. 40 and respective control signals.

Referring to FIGS. 40 and 43, the control signal VNE and control signals VPSRSTE and VNRSTE are set at a low level, a low level (inactive) and a high level (active) respectively when the charge pump circuit uses a positive potential VPS.

The potential of an output node of the invertor 536 reaches the power supply potential Vcc, which is an inverted level of the control signal VNE. The P-channel MOS transistor 538, which is supplied with the ground potential GND in its gate, is in a conducting state and the potential of the node N 10 reaches the power supply potential Vcc.

A negative reset circuit 52 activated by the control signal VNRSTE fixes the potential of the output node Noutn at the ground potential GND. The connection circuit 542 isolates the node N10 from the output node Noutn in response to the control signal VNE.

On the other hand, the control signal VNE brings the N-channel MOS transistor 540 into a non-conducting state, whereby the node N20 is isolated from the ground potential GND. Further, the connection circuit 544 connects the node N20 with the output node Noutp in response to the control signal VNE.

The control signal VPSRSTE inactivates a positive reset circuit 70, whereby the output node Noutp is isolated from the power supply potential Vcc.

Diodes 54 to 60 and capacitors 62 to 68 supplied with the clock signals φ and /φ bring the potential of the output node Noutp to a prescribed high potential VPS.

When the charge pump circuit uses a negative potential VNE, on the other hand, the control signals VNE, VPSRSTE and VNRSTE are set at a high level, a high level (active) and a low level (inactive) respectively.

The potential of the output node of the invertor 536 reaches the ground potential GND, which is an inverted level of the control signal VNE. The P-channel MOS transistor 538, which is supplied with the ground potential GND in its gate, enters a non-conducting state. Therefore, the node N10 is isolated from the ground potential GND.

The control signal VNRSTE inactivates the negative reset circuit 52, whereby the output node Noutn is isolated from the ground potential GND. Further, the connection circuit 542 connects the node N10 with the output node Noutn in response to the control signal VNE.

On the other hand, the control signal VNE brings the N-channel MOS transistor 540 into a conducting state, whereby the potential of the node N20 reaches the ground potential GND. The connection circuit 544 isolates the node N20 from the output node Noutp in response to the control signal VNE.

The positive reset circuit 70 activated by the control signal VPSRSTE fixes the potential of the output node Noutp at the power supply potential Vcc.

Therefore, the diodes 54 to 60 and the capacitors 62 to 68 supplied with the clock signals φ and /φ bring the potential of the output node Noutn to the prescribed negative potential VN.

Modifications similar to the modifications 1 to 9 of the embodiment 1 are also applicable to the embodiment 3.

While each of the above embodiments has been described with reference to a flash memory, the present invention is not restricted to such a flash memory but is applicable to any semiconductor device so far as the same includes a charge pump circuit generating a plurality of positive and negative potentials not simultaneously used in its interior.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device provided on a semiconductor substrate and having first and second operation modes, comprising:

an insulator film provided on said semiconductor substrate;

a first power supply node receiving a first power supply potential;

a first switching circuit connected between said first power supply node and a first internal node and brought into non-conducting and conducting states respectively in said first and second operation modes;

a first output node outputting a first output potential;

a second switching circuit connected between said first internal node and said first output node and brought into the conducting and non-conducting states respectively in said first and second operation modes;

a second power supply node receiving a second power supply potential lower than said first power supply potential;

a third switching circuit connected between said second power supply node and a second internal node and brought into the conducting and non-conducting states respectively in said first and second operation modes;

a second output node outputting second output potential;

a fourth switching circuit connected between said second internal node and said second output node and brought into the non-conducting and conducting states respectively in said first and second operation modes; and a voltage generating portion connected between said first internal node and said second internal node and driving a potential at said second internal node to a potential higher than at said first internal node, said voltage generating portion including a rectifying circuit having a plurality of rectifying elements serially connected between said first internal node and said second internal node to have the forward direction from said first internal node to said second internal node on a path from said first internal node to said second internal node, and each of said rectifying elements being formed on said insulator film.

2. The semiconductor device according to claim 1, wherein each of said rectifying elements is a poly-diode element and said semiconductor device further comprises:

an interlayer insulator film provided on a major surface of said semiconductor substrate to cover said rectifying element, and formed with first contact hole and second contact hole respectively exposing P-type layer and N-type layer;

a first resistive element provided in said first contact hole and connected to said P-type layer;

a second resistive element provided in said second contact hole and connected to said N-type layer;

a first interconnection layer connected to said P-type layer through said first resistive element; and a second interconnection layer connected to said N-type layer through said second resistive element.

3. A semiconductor device comprising:

a first power supply node receiving a first power supply potential;

a first switching circuit connected between said first power supply node and a first internal node;

a first output node outputting a first output potential;

a second switching circuit connected between said first internal node and said first output node;

a second power supply node receiving a second power supply potential lower than said first power supply potential;

a third switching circuit connected between said second power supply node and a second internal node;

a second output node outputting a second output potential;

a fourth switching circuit connected between said second internal node and said second output node;

a voltage generating portion connected between said first internal node and said second internal node and driving a potential at said second internal node to a potential higher than that at said first internal node;

a first reset circuit connected to said first output node and supplying a first specific potential to said first output node; and a second reset circuit connected to said second output node and supplying a second specific potential to said second output node.

4. The semiconductor device according to claim 3, wherein said first reset circuit operates when said second switching circuit is in an open state; and said second resent circuit operates when said fourth switching circuit is in an open state.

5. The semiconductor device according to claim 3, wherein said first specific potential and said second specific potential are power supply potentials externally supplied to said semiconductor device.

* * * * *